US008871008B2

(12) United States Patent
Henderson et al.

(10) Patent No.: US 8,871,008 B2
(45) Date of Patent: Oct. 28, 2014

(54) TARGET GAS CAPTURE

(75) Inventors: Matthew Alex Henderson, Calgary Alberta (CA); David William Keith, Calgary Alberta (CA); Arvinder Pal Singh Kainth, Calgary Alberta (CA); Kenton Robert Heidel, Calgary AB (CA); Jane Anne Ritchie, Calgary AB (CA)

(73) Assignee: Carbon Engineering Limited Partnership, Calgary, AB (CA)

( * ) Notice: Subject to any disclaimer, the term of this patent is extended or adjusted under 35 U.S.C. 154(b) by 0 days.

(21) Appl. No.: 13/606,926

(22) Filed: Sep. 7, 2012

(65) Prior Publication Data
US 2013/0059365 A1 Mar. 7, 2013

Related U.S. Application Data

(60) Provisional application No. 61/531,922, filed on Sep. 7, 2011.

(51) Int. Cl.
*B01D 53/14* (2006.01)
*B01D 53/22* (2006.01)

(52) U.S. Cl.
CPC .. *B01D 53/1425* (2013.01); *B01D 2252/20478* (2013.01); *B01D 2252/20494* (2013.01); *B01D 2252/602* (2013.01); *B01D 53/22* (2013.01); *B01D 53/1475* (2013.01); *B01D 2252/2053* (2013.01); *B01D 2251/606* (2013.01)
USPC .................. 95/172; 95/177; 95/190; 95/192; 95/196; 95/205; 95/206; 95/232; 95/236

(58) Field of Classification Search
None
See application file for complete search history.

(56) References Cited

U.S. PATENT DOCUMENTS

| 3,910,780 | A | 10/1975 | Henley et al. |
| 4,296,050 | A | 10/1981 | Meier |
| 4,600,544 | A | 7/1986 | Mix |
| 4,604,247 | A | 8/1986 | Chen et al. |

(Continued)

FOREIGN PATENT DOCUMENTS

| EP | 2163294 A1 | 3/2010 |
| EP | 2009080 A4 | 5/2010 |

(Continued)

OTHER PUBLICATIONS

English WO 2010014774 A2.*

(Continued)

*Primary Examiner* — Duane Smith
*Assistant Examiner* — Phillip Shao
(74) *Attorney, Agent, or Firm* — Fish & Richardson P.C.

(57) ABSTRACT

Capturing a target gas includes contacting a gas mixture including a target species with an aqueous solution including a buffer species, and transferring some of the target species from the gas mixture to the aqueous solution. The target species forms a dissolved target species in the aqueous solution, and the aqueous solution is processed to yield a first aqueous stream and a second aqueous stream, where the equilibrium partial pressure of the target species over the second aqueous stream exceeds the equilibrium partial pressure of the target species over the first aqueous stream. At least some of the dissolved target species in the second aqueous stream is converted to the target species, and the target species is liberated from the second aqueous stream. The target species can be collected and/or compressed for subsequent processing or use.

25 Claims, 14 Drawing Sheets

(56) References Cited

U.S. PATENT DOCUMENTS

| | | | |
|---|---|---|---|
| 4,929,399 | A | 5/1990 | Lockett et al. |
| 5,158,712 | A | 10/1992 | Wilhelm |
| 5,632,934 | A | 5/1997 | Billingham et al. |
| 5,637,263 | A | 6/1997 | Lang et al. |
| 5,901,575 | A | 5/1999 | Sunder |
| 6,119,481 | A | 9/2000 | Sunder |
| 6,143,556 | A | 11/2000 | Trachtenberg |
| 6,314,756 | B1 | 11/2001 | Lockett et al. |
| 6,349,567 | B1 | 2/2002 | Kessler |
| 6,357,728 | B1 | 3/2002 | Sunder et al. |
| 6,425,574 | B1 | 7/2002 | Sunder |
| 6,427,985 | B1 | 8/2002 | Kaibel et al. |
| 6,524,843 | B1 | 2/2003 | Blais et al. |
| 6,598,861 | B2 | 7/2003 | Sunder et al. |
| 6,811,147 | B2 | 11/2004 | Lau et al. |
| 6,991,222 | B2 | 1/2006 | Meski et al. |
| 7,521,217 | B2 | 4/2009 | Daigle et al. |
| 7,740,689 | B2 | 6/2010 | Fradette et al. |
| 7,828,883 | B2 | 11/2010 | Aines et al. |
| 2008/0078292 | A1 * | 4/2008 | Mimura et al. .................. 95/187 |
| 2009/0155889 | A1 | 6/2009 | Handagama et al. |
| 2010/0059377 | A1 * | 3/2010 | Littau et al. .................... 204/518 |
| 2010/0064890 | A1 | 3/2010 | Keith et al. |
| 2010/0229720 | A1 * | 9/2010 | Sonwane et al. .................. 95/46 |

FOREIGN PATENT DOCUMENTS

| | | |
|---|---|---|
| EP | 2229996 A1 | 9/2010 |
| JP | 2007253104 A | 10/2007 |
| JP | 2011104559 A | 6/2011 |
| WO | WO2008131132 A1 | 10/2008 |
| WO | WO 2010014774 A2 * | 2/2010 |
| WO | WO2010037109 A2 | 4/2010 |
| WO | WO2013036859 A1 | 3/2013 |

OTHER PUBLICATIONS

Mai et al., Vapor-Liquid Equilibria by Radioactive Tracer Techniques, Industrial and Engineering Chemistry, 1955, vol. 47, 1749-1757.

Eisaman et al., CO2 separation using bipolar membrane Electrodialysis, Energy and Environmental Science, The Royal Society of Chemistry, 2010, 10 pages.

Trachtenberg et al., Membrane-based, enzyme-facilitated, efficient carbon dioxide capture, Energy Procedia 1, (2009), pp. 3573-3600.

Geoffrey Holmes, et al., An air-liquid contractor for large-scale capture of CO2 from air, Phil. Trans. R. Soc. A, (2012) 370, pp. 4380-4403.

International Search Report and Written Opinion, International Application No. PCT/US2012/054298 dated Nov. 20, 2012, 12 pages.

Byung-Ki Na et al., CO2 Recovery from Flue Gas by PSA Process using Activated Carbon, Korean J. Chem. Eng., 18 (2), Jan. 9, 2001, pp. 220-227.

E.S. Kikkinides et al., Seperations: Concentration and Recovery of CO2 from Flue Gas by Pressure Swing Adsorption, Ind. Eng. Chem. Res., vol. 32, 1993, pp. 2714-2720.

Arthur Kohl, et al., Gas Purification, 5th Ed., 1997, pp. 330-414.

* cited by examiner

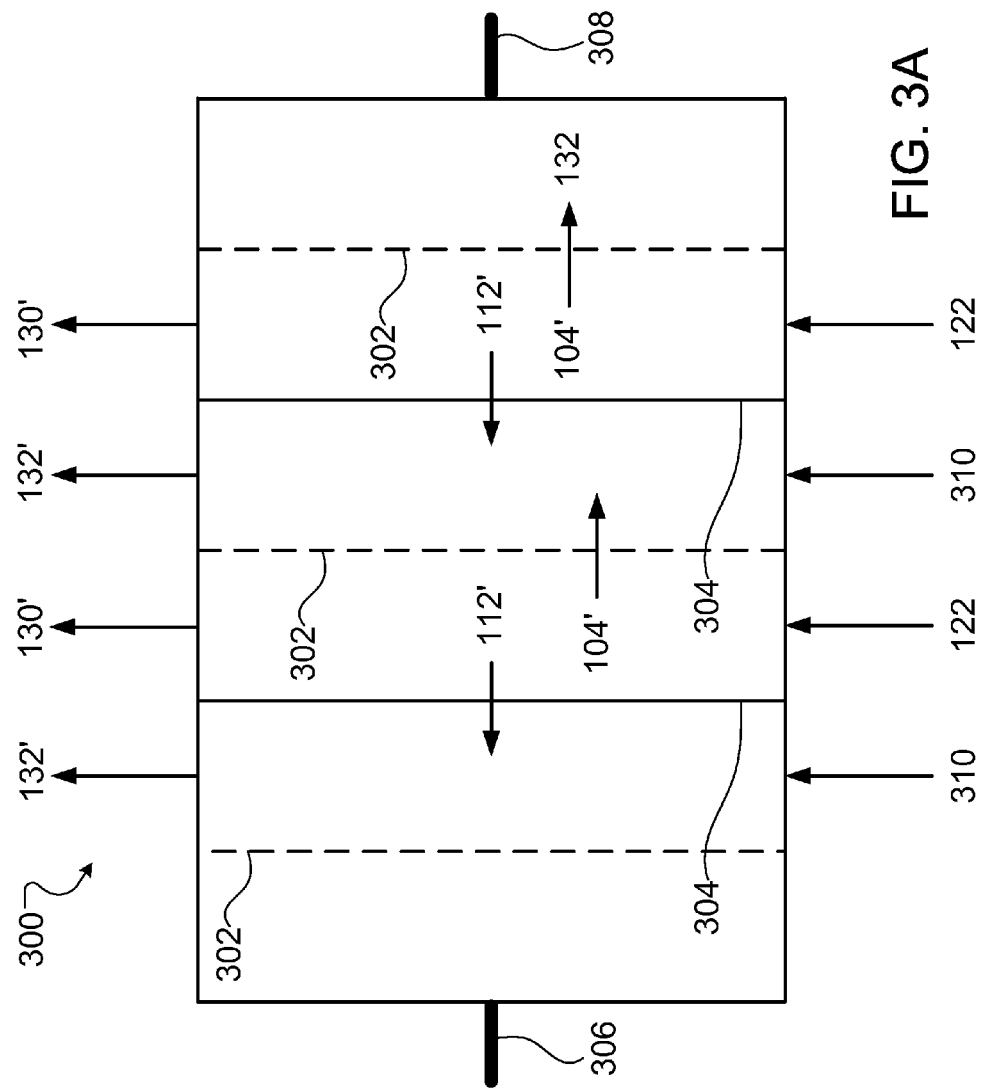

TARGET GAS CAPTURE

CROSS-REFERENCE TO RELATED APPLICATION

This application claims priority to U.S. Provisional Application Ser. No. 61/531,922, filed on Sep. 7, 2011, which is incorporated herein by reference in its entirety.

TECHNICAL FIELD

This invention relates to the capture of target gases from gas mixtures.

BACKGROUND

Carbon dioxide absorption using alkaline solutions has been described, in which carbon dioxide is absorbed into a solution of alkali-metal hydroxide. The resulting dissolved alkali-metal carbonate is treated (e.g., with calcium hydroxide) to generate a solid carbonate product (e.g., calcium carbonate) and the original alkali-metal hydroxide. The solid carbonate product is heated in a kiln to release carbon dioxide and generate a metal oxide. Upon dissolving the metal oxide back into water, the causticizing reactant (e.g., calcium hydroxide) is regenerated. These conventional caustic recovery processes include the use of calcium hydroxide, and alternative causticization processes include the use of borate (auto-causticization) and iron oxide or titanium dioxide (direct causticization). These causticization processes typically include heating to temperatures of at least 100° C., with the high temperature reactions in the kiln occurring around 900° C.

In the Benfield Process, $CO_2$ is absorbed into a concentrated solution of potassium carbonate at a given temperature of usually around 70° C. The solution comes to equilibrium under these conditions, and then is heated further under an applied pressure to temperatures generally in excess of 130° C. in which equilibrium is again reached, this time at a higher partial pressure of $CO_2$. The result is a system which absorbs $CO_2$ at low temperature and desorbs it at high temperature. This type of process is generally used to absorb $CO_2$ and other acid gases from high concentration flue gas streams.

SUMMARY

Implementations of the present disclosure are directed to devices, systems, and techniques for capture of target gases. As described herein, a first gaseous stream having an initial concentration of a target species is processed to yield a second gaseous stream having a concentration of the target species that exceeds the concentration of the target species in the first gaseous stream. This target gas enrichment process can be used with various target species including, for example, carbon dioxide found in atmospheric air and/or flue gas streams from fossil fuel combustion power generation systems. Advantages of this target gas enrichment process include, for example, economical enrichment of target gas species from dilute gaseous streams.

In a general aspect, target gas capture includes contacting a gas including a target species with an aqueous solution including a buffer species, such that some of the target species is transferred from the gas to the aqueous solution. The target species forms a dissolved target species in the aqueous solution. The aqueous solution is processed to yield a first aqueous stream and a second aqueous stream, where the equilibrium partial pressure of the target species over the second aqueous stream exceeds the equilibrium partial pressure of the target species over the first aqueous stream. At least some of the dissolved target species in the second aqueous stream is converted to the target species.

Implementations may include one or more of the following features. For example, in some cases, the ratio of the concentration of the dissolved target species to the sum of the concentration of the dissolved target species and twice the concentration of the buffer species in the second aqueous stream exceeds the ratio of the concentration of the dissolved target species to the sum of the concentration of the dissolved target species and twice the concentration of the buffer species in the first aqueous stream. The aqueous solution may further include a dissolved target species counterion, a buffer species counterion, or a combination thereof. In certain cases, the ratio of the concentration of the dissolved target species to the sum of the concentration of the dissolved target species counterion and the concentration of the buffer species counterion in the second aqueous stream exceeds the ratio of the concentration of the dissolved target species to the sum of the concentration of the dissolved target species counterion and the concentration of the buffer species counterion in the first aqueous stream. In some cases, the first aqueous stream has a higher concentration of the buffer species than the second aqueous stream, and the second aqueous stream has a higher (or lower) concentration of the dissolved target species than the first aqueous stream and the second aqueous stream has a higher ratio of the concentration of the dissolved target species to the sum of the concentration of the dissolved target species counterion and the concentration of the buffer species counterion in the first aqueous stream.

In some cases, the aqueous solution further includes a catalyst for increasing the rate of transfer of the target species from the gas to the aqueous solution. The catalyst may include, for example, carbonic anhydrase, zinc triazacycles, zinc tetraazacycles, copper glycinates, hydroxopentaaminecobalt perchlorate, formaldehyde hydrate, saccharose, fructose, glucose, phenols, phenolates, glycerin, arsenite, hypochlorite, hypobromite, or other oxyanionic species. When the aqueous solution includes the catalyst, the catalyst may be removed from the aqueous solution before processing the aqueous solution. In certain cases, the catalyst is immobilized on a packing material, and the buffer species, dissolved in solution, is contacted with the packing material. The catalyst may also be stabilized in solution form using methods such as self-agglomeration and encapsulation within a stabilizing shell. Removing the catalyst from the aqueous solution may include filtering the aqueous solution.

Processing the aqueous solution may include, for example, contacting the aqueous solution with a membrane to separate a portion of the buffer species from the dissolved target species or to separate a portion of the dissolved target species from the buffer species, heating the aqueous solution, or a combination thereof. Contacting the aqueous solution with the membrane may include flowing the aqueous solution through the membrane or across the membrane. In certain cases, contacting the aqueous solution with the membrane includes separating the buffer species and the dissolved target species based on ionic charge, hydrodynamic radius, or molecular weight (e.g., of the buffer species and/or the target species). In one example, the membrane is an ion-exchange membrane, such as a monovalent anion-exchange membrane, that preferentially facilitates the passage of monovalent anions over multivalent anions.

In some cases, processing the aqueous solution includes subjecting the aqueous solution to a process such as electrodialysis, reverse osmosis, ultrafiltration, microfiltration, nanofiltration, diffusion dialysis, dialysis, Donnan dialysis, piezodialysis, pervaporation, membrane distillation, ion chromatography, or a combination thereof. If present, a catalyst may be left in or removed from the solution.

In certain cases, after at least some of the dissolved target species in the second aqueous stream is converted to the target species, at least some of the target species is liberated from the second aqueous stream, and the liberated target species is collected. The second aqueous stream may be combined with the first aqueous stream after liberating at least some of the target species from the second aqueous stream. Liberating at least some of the target species from the second aqueous stream can include heating the second aqueous stream, reducing a pressure above the second aqueous stream, or a combination thereof.

Converting at least some of the dissolved target species in the second aqueous stream to the target species may include providing the second aqueous stream to a gas stripper, to a membrane distillation unit, or to a gas stripper and a membrane distillation unit in any order. Converting at least some of the dissolved target species in the second aqueous stream to the target species may include heating the second aqueous stream to a temperature between 20° C. and 200° C. (e.g., about 80° C., 100° C., or 120° C.). The target species may be collected. In some cases, the collected target species is compressed.

The gas including the target species can be air, flue gas from fossil fuel combustion, flue gas from biofuel combustion, gas from a geological source, industrial gas, or any combination thereof. A concentration of the target species in the gas may be less than 40 vol %, less than 30 vol %, less than 20 vol %, less than 10 vol %, or less than 5 vol %. The target species may be an acid gas. In some cases, the acid gas is selected from the group consisting of $H_2S$, $CO_2$, $SO_2$, $NO$, $NO_2$, and $N_2O$. A pH of the aqueous solution before processing can be less than 12 or less than 14 and/or greater than 8 or greater than 10. In some examples a pH of the aqueous solution is in a range from 8 to 14 or in a range from 10 to 12. In other examples, a pH of the aqueous solution is in a range from 8 to 13, 10 to 14, or 12 to 14. In some cases, the buffer species is neutral.

In certain cases, the buffer species is a neutral species or a monovalent, divalent, or trivalent anion, and the dissolved target species is a monovalent anion. In some cases, the target species is $CO_2$, and the dissolved target species is bicarbonate or a carbamate. In other cases, the dissolved target species is a carbamate derivative originating from the uptake of $CO_2$ by amine or alkanolamine buffers. The buffer species may be organic or inorganic, and is selected from the group consisting of carbonate ions, phosphate ions, amines, alkanolamines, and amino acids.

In another general aspect, capturing a target gas includes contacting a gas mixture including a target species with an aqueous solution including a buffer species and a catalyst, and transferring some of the target species from the gas to the aqueous solution. The catalyst is removed from the aqueous solution, and the aqueous solution from which the catalyst has been removed is processed to liberate at least some of the target species. In some cases, processing the aqueous solution includes heating the aqueous solution.

In another general aspect, an apparatus for target gas capture includes a gas absorber arranged to contact a gas including a target species with an aqueous buffer solution selected to absorb the target species, and a membrane fluidically coupled to the gas absorber and adapted to separate a buffer species in the aqueous buffer solution from a dissolved target species or to separate a portion of the dissolved target species in the aqueous buffer solution from a buffer species in the aqueous buffer solution. A gas stripper, a membrane distillation unit, or both are fluidically coupled to the membrane and configured to shift a chemical equilibrium between the dissolved target species and the target species to liberate the target species.

Implementations can include one or more of the following features. For example, in some cases, the membrane is an ion-exchange membrane that preferentially facilitates the passage of anions or cations. For example, the membrane can be a monovalent anion-exchange membrane that preferentially favors the passage of monovalent anions over the passage of divalent, trivalent, or multivalent anions. In another example, the membrane is configured to filter the aqueous solution based at least in part on hydrodynamic radius or molecular weight of the buffer species and the target species. In certain cases, a gas compressor fluidically coupled to the gas stripper, the membrane distillation unit, or both is configured to compress the liberated target species. A filter may be fluidically coupled between the gas absorber and the membrane and adapted to remove a catalyst from the aqueous buffer solution.

In some implementations, the membrane is replaced by or supplemented with a chromatography column to facilitate the separation of a dissolved target species and a buffer species (e.g., bicarbonate and carbonate, respectively). This may be achieved, for example, by contacting a solution including a target species and a buffer species with a chromatography column selected to allow the dissolved target species to pass through the column at a different rate (e.g., more quickly or more slowly) than the buffer species. Accordingly, species in the solution are separated based on differential mobilities in the column.

In another general aspect, a system for target gas capture includes an aqueous solution including a buffer species and a gas absorber arranged to contact a gas including a target species with the aqueous solution, thereby transferring the target species to the aqueous solution and forming a dissolved target species in the aqueous solution. A membrane fluidically coupled to the gas absorber is adapted to form a first aqueous stream and a second aqueous stream, the second aqueous stream having a higher partial pressure of dissolved target species than the first aqueous stream. A gas stripper, a membrane distillation unit, or both are fluidically coupled to the membrane and configured to shift a chemical equilibrium between the dissolved target species and the target species, thereby liberating at least some of the target species from the second aqueous stream.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the present aspects and implementations, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

These general and specific aspects may be implemented using a device, system, or method, or any combination of devices, systems, or methods. The details of one or more embodiments are set forth in the accompanying drawings and the description below. Other features and advantages will be apparent from the following description and drawings, and from the claims.

BRIEF DESCRIPTION OF THE DRAWINGS

The concepts herein may be more completely understood in consideration of the following detailed description of various embodiments in connection with the accompanying drawings, in which:

FIGS. 3A and 3B depict illustrative membrane separation units;

DETAILED DESCRIPTION

Figure 1A:
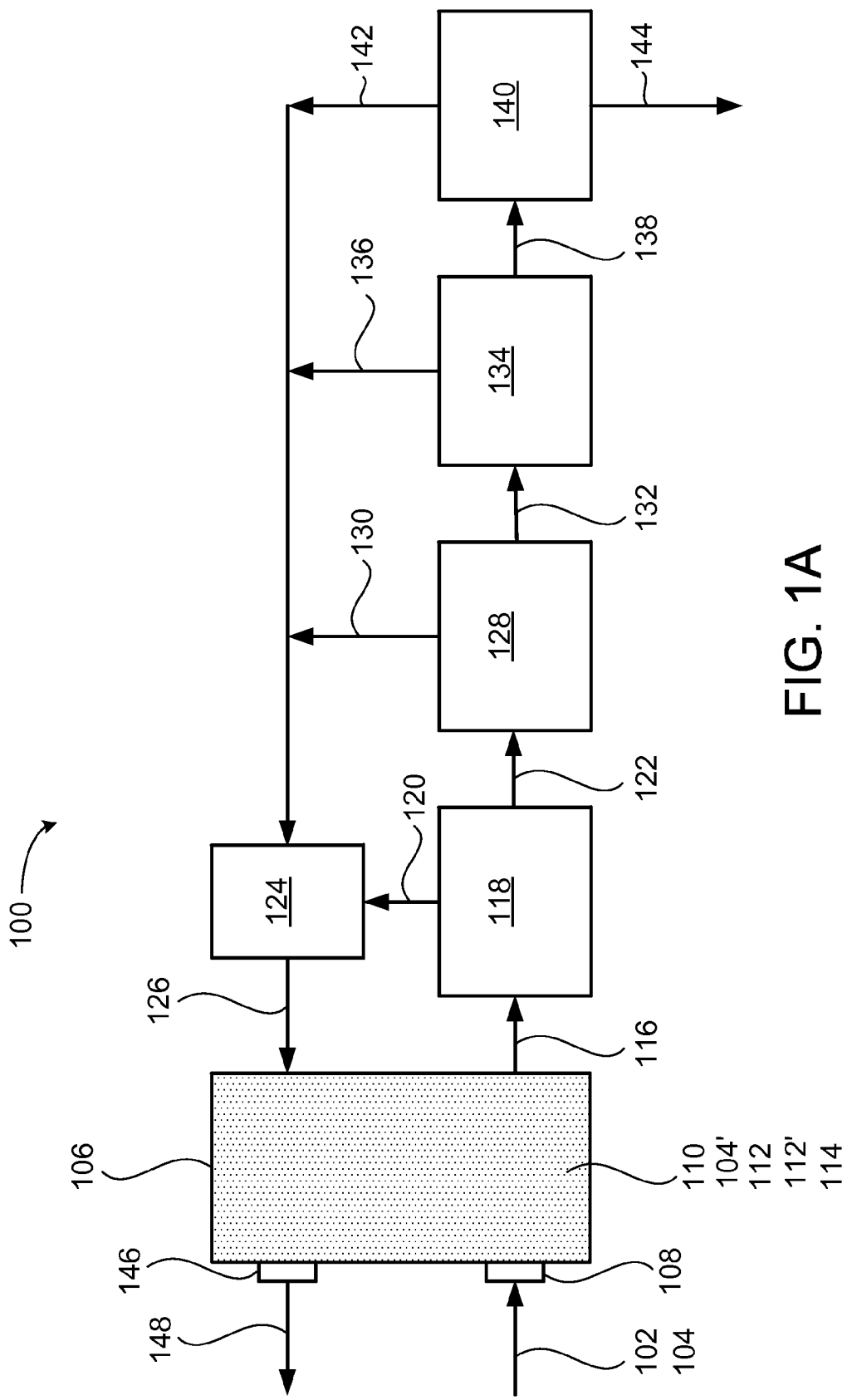
FIGS. 1A-1D depict illustrative systems for the capture of target gases.

FIGS. 1A-1D depict systems configured to capture a target gas. Referring to FIG. 1A, target gas capture is described with respect to illustrative system 100. Target gases include, for example, carbon dioxide ($CO_2$), hydrogen sulfide ($H_2S$), sulfur dioxide ($SO_2$), nitrogen dioxide ($NO_2$), nitric oxide (NO), nitrous oxide ($N_2O$), and the like. As depicted in FIG. 1A, gaseous stream 102 including one or more target species 104 is provided to contactor 106 through inlet 108. Gaseous stream 102 may be, for example, air, flue gas (e.g., from an industrial facility), exhaust gas, or any gaseous stream including a target species. A concentration of target species 104 in gaseous stream 102 is not limited. In some cases, however, a concentration of target species 104 is up to 1 vol % (e.g., in a range from 0.001 vol % to 1 vol %, in a range from 0.01 vol % to 1 vol %, in a range from 0.1 vol % to 1 vol %, etc.), up to 20 vol % (e.g., in a range from 1 vol % to 20 vol %), or up to 40 vol % (e.g., in a range from 5 vol % to 40 vol %, in a range from 10 vol % to 20 vol %, etc.). In an example, a concentration of carbon dioxide in air is less than 1 vol %, and a concentration of carbon dioxide in flue gas is in a range from 1 vol % to 15 vol %. Contactor 106 facilitates absorption of gas (e.g., target species 104) by aqueous solution 110 (e.g., by transfer of target species 104 from gaseous stream 102 to aqueous solution 110) in the contactor.

In some cases, aqueous solution 110 is an aqueous buffer solution including one or more buffer species 112. As used herein, "buffer species" generally refers to a chemical species capable of absorbing a proton, thereby maintaining a substantially constant concentration of hydrogen ions, during a chemical reaction in which protons are generated as a product of the reaction. Aqueous solution 110 may be basic, with a pH greater than 7, greater than 8, greater than 10, or greater than 12. In some examples, a pH of aqueous solution 110 is in a range from 7 to 14, from 8 to 13, from 9 to 11, from 9 to 12, from 9 to 13, or from 10 to 12. Buffer species 112 in aqueous solution 110 can be ionic or neutral, organic or inorganic, or any combination thereof. An ionic buffer species may be, for example, anionic or cationic, with any charge magnitude (e.g., monovalent, divalent, trivalent, etc.), or zwitterionic, in which both a positive charge and a negative charge are present on the same molecule.

An initial concentration of buffer species 112 may be selected to achieve a desired equilibrium among components in aqueous solution 110, including target species 104, dissolved target species 104', buffer species 112, and the like. Dissolved target species 104' may be the same as target species 104, a solvate of the target species (e.g., a hydrate), or an ion (e.g., formed by the interaction of the target species with a component of aqueous solution 110, such as hydrogen ions or hydroxide ions). As described herein, a chemical species, such as dissolved target species 104', is identified by chemical structure rather than origin. For example, dissolved target species 104' may originate from buffer species 112 as well as target species 104. Counterion 112' may also be present in aqueous solution 110. As used herein, counterion 112' generally refers to counterions associated with buffer species 112 (the buffer species counterion), counterions associated with the dissolved target species 104' (the dissolved target species counterion), or both, if present, as needed for charge neutrality.

In some cases, an initial concentration of buffer species 112 is in a range from 0.1M to 10M, where M=moles/liter. In certain cases, aqueous solution 110 includes catalyst 114 selected to increase the rate of absorption of target species 104 by the aqueous solution. A concentration of catalyst 114 may be, for example, in a range from 0.01 g/L to 1000 g/L (e.g., 0.5 g/L to 2 g/L, 1 g/L to 3 g/L, 1 g/L to 5 g/L, 1 g/L to 10 g/L, 10 g/L to 100 g/L, 100 g/L to 1000 g/L, or 500 g/L to 1000 g/L, where g/L represents grams of catalyst per liter of solution. In some cases, a catalyst is immobilized on a surface of a component of system 100 (e.g., on a packing surface in contactor 106).

Catalyst 114 may include, for example, naturally occurring catalysts such as carbonic anhydrase, as well as synthetic derivatives such as zinc triazacycles and tetraazacycles, as well as alkali hypohalogenites (e.g., sodium/potassium hypochlorite, hypobromite, hypoiodite, hypofluorite) or other oxyanionic species, sodium arsenate, as well as certain copper, cobalt and cadmium inorganic compounds (e.g., copper glycinate, cobalt hydroxopentaamine cobalt perchlorate), formaldehyde hydrate, sacchararose, fructose, glucose, phenols, phenolates, glycerine, arsenite). The catalysts may be solid state catalysts, dissolved in solution, or solution phase catalysts that have been immobilized on a solid support or stabilized by immobilization methods generally known in the art.

In general, the partial pressure of target species 104 in the gas phase (e.g., gaseous stream 102) above a solution (e.g., aqueous solution 110) will reach an equilibrium with the partial pressure of dissolved target species 104' in the solution. The concentration of dissolved target species 104' in solution corresponds to the equilibrium partial pressure of the dissolved target species, which corresponds to the partial pressure of target species 104 in the gas phase and which is a function of one or more parameters. Those parameters can include, for example, the concentration of counterion 112', temperature of the solution, absolute pressure of the gaseous phase above the solution, and the like. If a solution and the gas phase above the solution were to reach equilibrium with one or more of these parameters held constant, and subsequently at least one of these parameters were changed, the partial pressure of the dissolved target species 104', and thus the partial pressure of target species 104 in the gas phase, would change accordingly (i.e., increase or decrease) until a new equilibrium were reached.

The equilibrium partial pressure of target species 104 can be assessed by methods known in the art. In one example, the equilibrium partial pressure of target species 104 is assessed by multiplying the total pressure of a gas mixture above an aqueous stream by the mole fraction of the target species in the gas mixture. The concentration of the target species may be measured directly with a measuring device that is selective to the desired target species 104. The concentration of dissolved target species 104' and buffer species 112 can be assessed in a number of ways. In one example, a portion of an aqueous stream is titrated (e.g., under pressure and in a closed environment to avoid degassing of target species 104 from the aqueous stream). Alternatively, a concentration of counterion 112' can be assessed (e.g., under pressure and in a closed environment), and then concentrations of dissolved target species 104' and buffer species 112 can be calculated using measured values of pH or conductivity.

Studies of vapor liquid equilibria for different gaseous and solution compositions have been conducted previously. An example including carbon dioxide, water, and carbonate buffer systems is described in Mai et al., *Industrial and Engineering Chemistry*, Vapor-Liquid Equilibria by Radioactive Tracer Techniques, 1955, Vol. 47, 1749-1757, which is incorporated by reference herein. In this reference, the partial pressure of carbon dioxide in a sodium carbonate buffered aqueous solution was determined to be predicted by the following empirical formula:

$$\text{Partial CO}_2 \text{ Pressure} = \frac{16756 \cdot f^2 \cdot C^{1.362}}{1-f} e^{-2729/T}, \quad (1)$$

in which f represents the concentration of bicarbonate ions divided by the concentration of sodium counterions in solution, C represents the total sodium counterion concentration, and T is the absolute temperature (in Kelvin). The partial pressure of carbon dioxide ($CO_2$) is expressed in units of kilopascal (kPa).

If a sodium bicarbonate/sodium carbonate solution is titrated with an acid (e.g., hydrochloric acid), the concentration of sodium can be calculated and the original fraction of sodium bicarbonate in solution can be assessed. The temperature of the solution can be measured directly, and these three parameters can be used to calculate the partial pressure of carbon dioxide in the solution. At equilibrium, the partial pressure of carbon dioxide in the solution will be the same as the partial pressure of carbon dioxide in the gas phase above the solution.

In an example, contactor 106 is configured to achieve cross-current flow of gaseous stream 102 through aqueous solution 110, thereby facilitating absorption of target species 104 by the aqueous solution. U.S. Patent Publication No. 2010/0064890, which is incorporated by reference herein, describes contactors for use in the capture of carbon dioxide from air.

Figure 2:
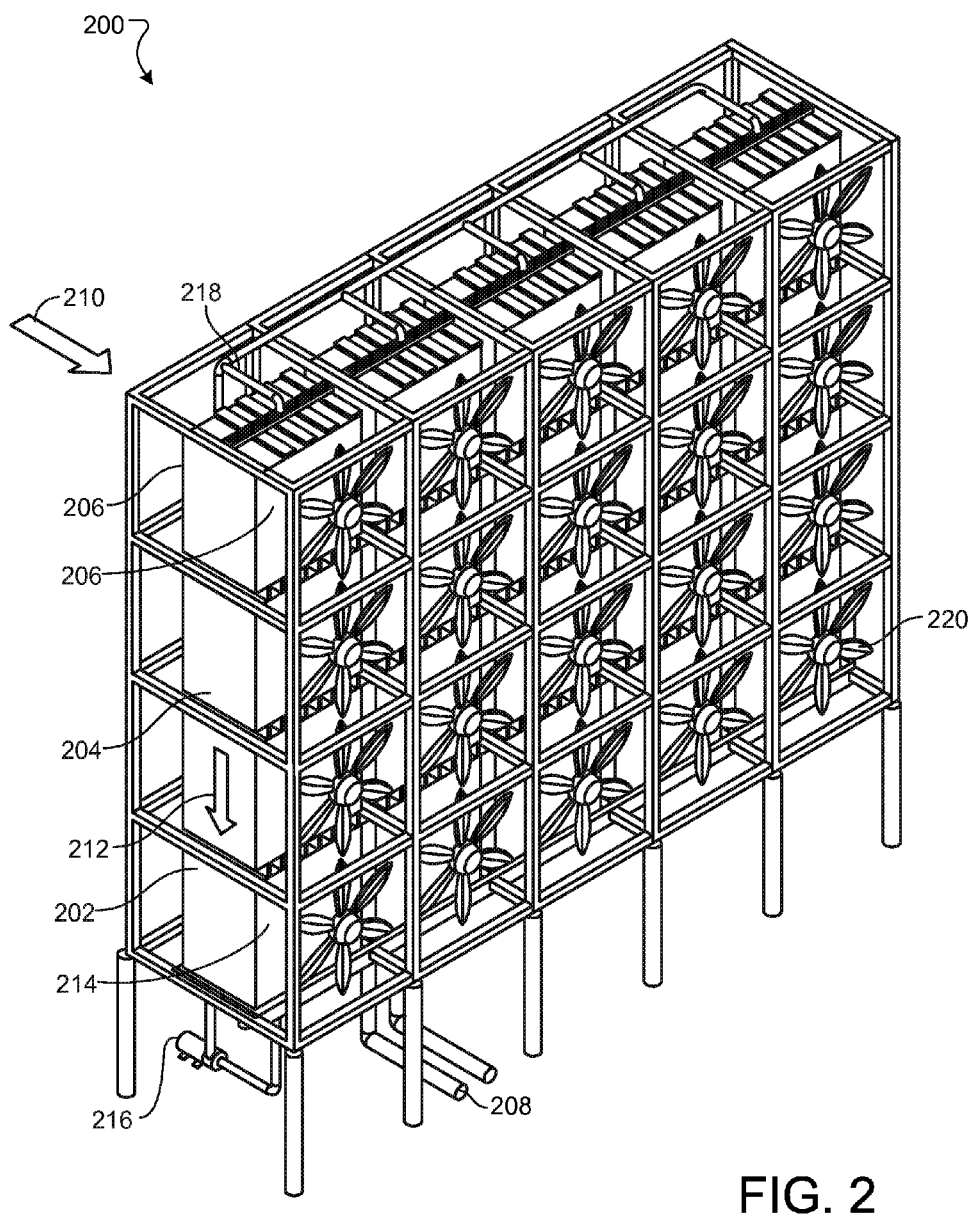
FIG. 2 depicts an illustrative gas contactor for contacting a gas mixture with an aqueous stream.

FIG. 2 depicts an example of a contactor from U.S. Patent Publication No. 2010/0064890. Contactor 200 includes packing 202 formed as a slab 204, the slab having opposed dominant faces 206, and the opposed dominant faces being at least partially penetrable to a mixture of gases (e.g., air or flue gas) to allow the mixture to flow through the packing. At least one liquid source 208 is oriented to direct absorbent liquid (e.g., an aqueous solution) into packing 202 to flow through slab 204. Slab 204 is disposed in gas flow 210 that has a non-zero incident angle with one of opposed dominant faces 206. Packing 202 may be oriented to direct the flow of absorbent liquid through the slab 204 in a mean flow direction 212 that is parallel to a plane 214 defined by opposed dominant faces 206. It should be understood that opposed dominant faces 206 may not be parallel. In some examples, opposed dominant faces 206 may be converging, diverging, or curved. Packing 202 may be oriented to allow the liquid absorbent to flow through the packing by gravity, as illustrated.

The non-zero incident angle of the gas flow 210 indicates that gas flow strikes face 206 at an angle greater than zero. This may be contrasted with other (e.g., counterflow) packing arrangements in which gas flows through a tower of packing starting from the bottom and going toward the top, while the liquid flows from the top to the bottom. The non-zero incident angle may also refer to the mean angle of flow of the gas mixture. The mean angle of flow of the gas mixture may be averaged over a period of time.

Contactor 200 may also include pump 216. Pump 216 may have one or more distribution pipes 218, controlled by a valve (not shown), in order to selectively apply liquid into various sections of packing 202. Pump 216 may be configured to supply the absorbent liquid in a series of pulses. One or more fans 220 may be oriented to influence gas flow through at least a section of one of the opposed dominant faces 206 of packing 202. Fans 220 may be reversible. In some cases, fans 220 may inhibit gas that has already flowed through packing 202 from circulating back into the packing. An aqueous stream including dissolved target species 104' flows from contactor 200 for further processing.

Referring again to FIG. 1A, aqueous solution 110, including buffer species 112 and/or counterion 112', dissolved target species 104', and optional catalyst 114, is provided (e.g., flows or is pumped) from contactor 106 as aqueous stream 116 to optional filter 118. Filter 118 may be, for example, an ultrafiltration device or other filtration unit selected to separate catalyst 114, if present, from aqueous stream 116 before further processing of (e.g., before heating) the aqueous stream. Suitable filters include materials such as cellulose acetate, composite polyamide, polysulfone, polyethersulfone, polyvinylidine fluoride, polypiperazine amide, and the like, and are available, for example, from Sterlitech (Kent, Wash.). Filter 118 mechanically separates catalyst 114 from aqueous stream 116, forming aqueous stream 120 including the catalyst and aqueous stream 122 substantially free of the catalyst. As used herein, "substantially free of the catalyst" generally refers to a catalyst concentration of less than that in aqueous stream 116 before removal by filter 118, or in some cases, less than 0.1 g/L. Aqueous stream 120 may be returned to contactor 106 through optional mixer 124 as aqueous stream 126, such that catalyst 114 is recycled to aqueous solution 110. In some cases, mixer 124 is a vessel including, for example, a mechanical stirrer. In other cases, mixer 124 may be a conduit with a size, shape, and optional features (e.g., baffles) selected to achieve non-turbulent or turbulent flow of fluid through the mixer.

Aqueous stream 116 may be divided into aqueous stream 120 and 122 in a selected volume ratio. For example, aqueous stream 120 may include at least 10%, at least 20%, at least 30%, at least 40%, or at least 50% of the volume of aqueous stream 116, and aqueous stream 122 may include up to 90%, up to 80%, up to 70%, up to 60%, or up to 50% of the volume of aqueous stream 116, respectively. Aqueous streams 120 and 122 may be substantially similar except for catalyst concentration (e.g., the catalyst concentration in aqueous stream 120 may be about 1 g/L, and the catalyst concentration in aqueous stream 122 may be less than about 0.1 g/L). For example, buffer species 112 (or counterion 112') and dissolved target species 104' in aqueous stream 116 may be unaffected by filter 118, such that the concentration of buffer species 112 (or counterion 112') and the concentration of dissolved target species 104' are substantially the same in aqueous streams 116, 120, and 122.

Aqueous stream 122 is provided (e.g., flows or is pumped) to separation system 128. In some cases (e.g., when system 100 includes filter 118, or when a catalyst is not used), aqueous stream 122 may be substantially free of catalyst 114. In other cases (e.g., when filter 118 is not present), aqueous stream 122 may include catalyst 114. As noted previously, the concentrations of dissolved target species 104' and buffer species 112 or counterion 112' in aqueous stream 122 can be substantially the same as the concentrations of dissolved target species 104' and buffer species 112 or counterion 112' in aqueous stream 116.

Separation system 128 may include one or more separation units of the same or different types (e.g., membrane separation units, nanofiltration units, chromatography columns, and the like). In separation system 128, aqueous stream 122 is processed to separate buffer species 112 and buffer species counterion from dissolved target species 104' and the dissolved target species counterion. If present, catalyst 114 may also be separated from dissolved target species 104'. This selective separation yields aqueous stream 130 and aqueous stream 132. The equilibrium partial pressure of target species 104 over aqueous stream 132 exceeds the equilibrium partial pressure of the target species over one or more streams in system 100 such as aqueous streams 116, 120, 122, and 130 and gas stream 102, as determined, for example, by methods described herein. In some cases, aqueous stream 132 has a higher fractional concentration of dissolved target species 104' than aqueous stream 130. That is, the concentration of dissolved target species 104' divided by the concentration of the dissolved target species 104' plus twice the concentration of the buffer species 112 for aqueous stream 132 may exceed that for aqueous stream 130. This may also be described as the concentration of dissolved target species 104' divided by the concentration of the buffer species counterion and the dissolved target species counterion being higher in stream 132 than in stream 130. In some cases, aqueous stream 132 has a greater concentration of dissolved target species 104' than one or more of aqueous solution 110 and aqueous streams 116, 120, 122, and 130. In certain cases, aqueous stream 130 includes a majority of buffer species 112 from aqueous stream 122, and aqueous stream 132 includes a majority of dissolved target species 104' from aqueous stream 122.

Membrane separation units are generally known and used in processes (e.g., desalination and water purification) in which a feed stream including a mixture of ions in a solvent is selectively separated into product streams. Driving forces for membrane separation processes may include, for example, electricity, pressure, temperature, concentration differences, or salinity gradients. In some cases, the concentration of a dissolved target species is higher in a output stream from a membrane separation unit than in the input stream to the membrane separation unit. In certain cases, the concentration of a dissolved species may have a higher fractional concentration in a product stream than in the feed stream.

As described herein, when separation system 128 includes a membrane separation unit, aqueous stream 122 contacts or flows through or across one or more membranes (e.g., tens or hundreds of membranes) in the separation unit selected to facilitate separation of dissolved target species 104' and buffer species 112. The one or more membranes in separation system 128 can be the same or different. One membrane in separation system 128 may be an ion exchange membrane (e.g., a monovalent anion exchange membrane). This type of membrane may be used in a process such as, for example, electrodialysis. Another membrane in membrane system 128 may separate dissolved species based on hydrodynamic radius or molecular weight cut-off limits. This type of membrane is typically used in membrane separation systems that include a filtration aspect, such as reverse osmosis, ultrafiltration, microfiltration, nanofiltration, diffusion dialysis, or the like. Aqueous stream 132 may exit separation system 128 with a higher partial pressure of target species 104 than aqueous stream 122 and/or aqueous stream 130, a higher concentration of dissolved target species 104' than aqueous stream 122 and/or aqueous stream 130, a higher fractional concentration of dissolved target species 104' than aqueous stream 122 and/or aqueous stream 130, or any combination thereof.

FIG. 3A depicts an illustrative membrane separation unit 300 for use with monovalent anionic dissolved target species 104', divalent anionic buffer species 112, and monovalent cationic counterion 112'. Membrane separation unit 300 includes juxtaposed monovalent anion exchange membranes 302 and cation exchange membranes 304, as well as cathode 306 and anode 308. Aqueous stream 122 may be provided as indicated between cation exchange membranes 304 and monovalent anion exchange membranes 302. Solvent 310 (e.g, water or an aqueous solution) is provided adjacent to aqueous stream 122 between monovalent anion exchange membranes 302 and cation exchange membranes 304. As indicated with respect to FIG. 1A, aqueous stream 122 may include catalyst 114, buffer species 112 and counterion 112', and dissolved target species 104'.

During operation of membrane separation unit 300, components of aqueous stream 122 are separated based at least in part on charge, such that dissolved target species 104' pass through monovalent anion exchange membranes 302, and some of counterion 112' pass through cation exchange membranes 304 to balance the charge of the dissolved target species. Solvent 310 flows between monovalent anion exchange membranes 302 and cation exchange membranes 304 to such an extent as to maintain effective (e.g., optimal) operation, and exits membrane separation unit 300 as aqueous stream 132' including counterion 112' and dissolved target species 104'. Aqueous stream 132' flows from membrane separation unit 300 to a gas stripper. At the same time, aqueous stream 122 flows between cation exchange membranes 304 and monovalent anion exchange membranes 302 and exits as aqueous stream 130', including catalyst 114 (if present), buffer species 112, and counterion 112' to achieve charge neutrality. Aqueous stream 130' may also include a small amount of dissolved target species 104' which was not transported across monovalent anion exchange membrane 302. Referring to FIG. 1A, stream 130' may be returned to contactor 106 as stream 130, and stream 132' may be routed as stream 132 to gas stripper 134.

In some cases, separation system 128 is a nanofiltration unit. Nanofiltration may be used, for example, to achieve separation of components in a solution by using an applied pressure (e.g., in a range from 2 to 100 atm) as a driving force for separation with a membrane that filters solution components based on molecular weight cut-off limits or solution phase hydrodynamic radius. A nanofiltration unit can be used to separate at least some (e.g., a majority of) monovalent ions from multivalent ions if the hydrodynamic radius or molecular weight cut-off is selective to one of the species (e.g., the monovalent ion) over other species (e.g., the multivalent ion). In some nanofiltration processes, the concentration of a species may be higher in the product stream than in the feed stream. This phenomenon is generally referred to as "negative rejection." In certain cases, this increase in concentration is also observed with an increase in fractional concentration.

Figure 3B:
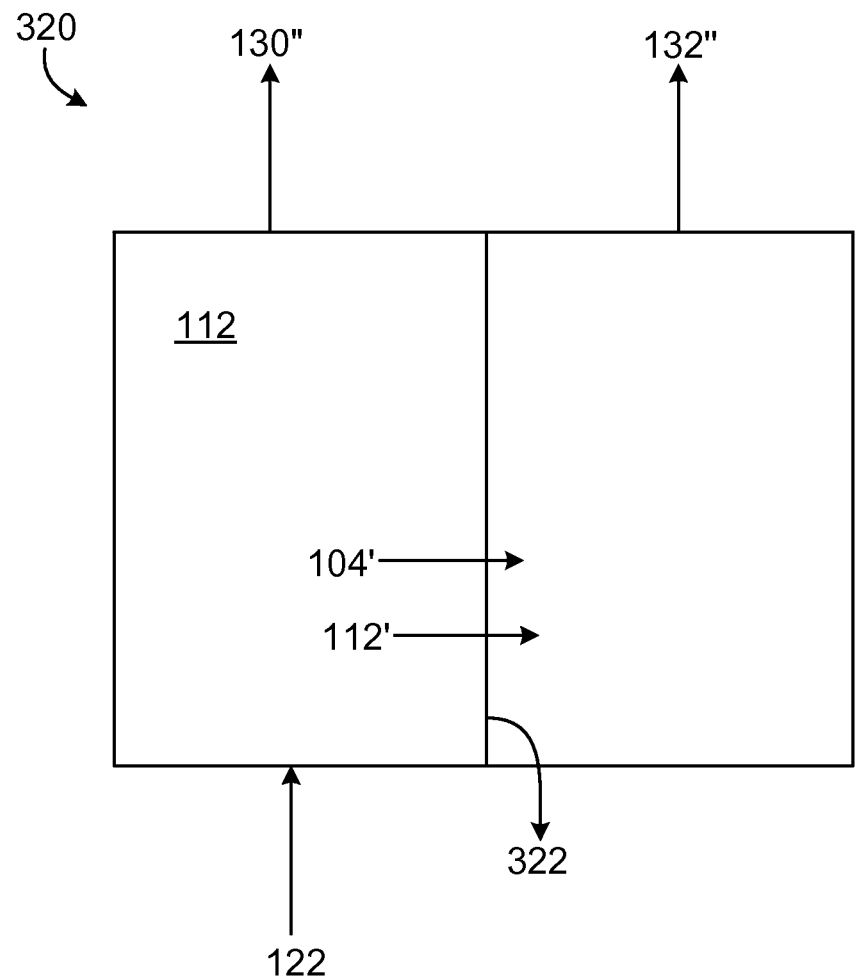

FIG. 3B depicts nanofiltration unit 320 for use with monovalent anionic dissolved target species 104', divalent anionic buffer species 112, and monovalent cationic counterion 112'. In one example, as described with respect to FIG. 3B, dissolved target species 104' is a monovalent anion, buffer species 112 is a divalent anion, and counterion 112' is a monovalent cation. Nanofiltration unit 320 includes membrane 322 which, according to the example described with respect to FIG. 3B, filters solution components based on molecular weight cut-off limits or hydrodynamic radius. An example of a membrane that works for nanofiltration is the KMS-SR100 membrane, manufactured by KOCH Membrane Systems. Aqueous stream 122 is provided to nanofiltration unit 320 on a downstream side of membrane 322. Dissolved target species 104', counterion 112', and the solvent may pass through or across membrane 322 and exit nanofiltration unit 320 as stream 132'', having a higher fraction of dissolved target species 104' (with respect to the concentration of counterion 112') and, in some cases, a higher concentration of dissolved target species 104'. Stream 130'', from the downstream side of membrane 322, may be returned to contactor 106 (e.g., via mixer 124), and stream 132'' may be routed to one or more components of system 100 depicted in FIG. 1A (e.g., routed as stream 132 to gas stripper 134) to further concentrate dissolved target species 104' and to increase the partial pressure of the dissolved target species.

In some cases, separation system 128 includes an ion chromatography column selected to separate one or more species in aqueous stream 122. The solid phase in the column may include, for example, silica ($SiO_2$), alumina ($Al_2O_3$), calcium carbonate ($CaCO_3$), or other material having a differential affinity to different chemical species (e.g., a dissolved target species and a buffer species). In one example, after the aqueous stream or a portion thereof is provided to the solid phase, a selected solvent mixture (the "mobile phase") is provided to the column. The mobile phase may be water or an aqueous solution. Each species in the aqueous stream (e.g., neutral molecules, monovalent anions or cations, divalent anions or cations, trivalent anions or cations will reach an equilibrium between being "bound" to the solid phase and "dissolved" in the mobile phase. As the mobile phase is washed through the column, each species will move with the mobile phase at a rate that is determined, at least in part, by that species' affinity to the solid phase. Species that are strongly bound to the solid phase will move more slowly through the column than species that are less strongly bound to the solid phase. As the mobile phase elutes from the column, species in the aqueous stream can be collected to achieve a desired separation. In one example, the selected eluent has a low concentration but high fractional concentration of the dissolved target species. The concentration of the dissolved target species can be increased by a concentrating process such as, for example, reverse osmosis, electrodialysis, membrane dialysis, evaporation, pervaporation, and the like, thereby increasing the partial pressure of the dissolved target species in the solution.

Referring again to FIG. 1A, after separation of dissolved target species 104' from buffer species 112, aqueous stream 130 is provided to optional mixer 124 and returned to contactor 106 through aqueous stream 126, or returned to the contactor directly. Aqueous stream 132 is provided to gas stripper 134. In some cases, removal of catalyst 114 (if present) before providing aqueous stream 132 to gas stripper 134 provides one or more advantages. For example, filtration of the aqueous stream to remove catalyst 114 before heating allows the catalyst to be optionally recycled to contactor 106, thereby eliminating or reducing the possibility of damaging (e.g., denaturing or decomposing) the catalyst during further processing of the aqueous stream. Recovering catalyst 114 earlier in the process described with respect to system 100 (e.g., before separation system 128) reduces loss of the catalyst at successive stages in the process, thus improving the efficiency and cost-effectiveness of the target gas capture.

In gas stripper 134, aqueous stream 132 may be subjected to an increased temperature, a decreased pressure, or both, in a temperature swing regeneration process, pressure swing regeneration process, or combination thereof, to further shift the chemical equilibrium between the dissolved target species 104' and the target species 104, thereby evolving or liberating the target species from aqueous stream 132 in gas stripper 134. Gas stripper 134 is generally understood to be one of various designs known in the art and can function as a distillation column, in which the target-species-rich stream is treated to release the target species. In some cases, gas stripper 134 includes a membrane distillation unit as described herein. As described herein, converting the dissolved target species 104' to target species 104 may include heating aqueous stream 132 to a temperature between 20° C. and 100° C. The aqueous stream 132 may also be heated under higher pressure than atmospheric pressure, thereby allowing a temperature exceeding 100° C. in gas stripper 134 to be attained, and achieving a higher partial pressure of target species 104 in fluid stream 138. In some cases, fluid stream 138 is a gaseous stream. Aqueous stream 132 has a higher partial pressure of target species 104' than aqueous stream 116. Thus, gaseous stream 102 having an initial concentration of target species 104 can be processed to yield fluid stream 138 having a concentration of target species 104 that exceeds the concentration of the target species in the gaseous stream 102.

In some cases, gas stripper 134 may be held at a substantially constant temperature, for example, between 90° C. and 100° C. at standard atmospheric pressure. Aqueous solution 132 in gas stripper 134 has a higher partial pressure of target species 104 than the gas phase in stripper 134 and will release the dissolved target species 104' from solution into the gas stream to form fluid stream 138. Fluid stream 138 will then be enriched in target species 104 with respect to the gaseous stream 102, effectively increasing the concentration of target species 104.

The concentration of target species 104 in gas stripper 134 typically exceeds the concentration of the target species in gaseous stream 102 by a factor of at least 10 and up to 10,000 or 100,000. The combination of separation system 128 (e.g., including one or more membrane separation units, one or more ion chromatography columns, one or more other separation units, or any combination thereof) and the gas stripper typically increases the partial pressure of the target species (e.g., $CO_2$) such that the target species can be handled by conventional equipment for compression and later use of $CO_2$ at concentrations over a range of values for a variety of purposes (e.g., high purity $CO_2$ at high pressure for a pipeline, high purity $CO_2$ at ambient temperature and pressure, dilute $CO_2$ (although more concentrated than $CO_2$ in gaseous stream 102)).

After at least some of target species 104 is evolved from aqueous stream 132, aqueous stream 136, may have a reduced concentration of dissolved target species 104' relative to that of aqueous stream 132 (and, in some cases, including buffer species 112), is provided to optional mixer 124 and returned to contactor 106 through liquid stream 126. Fluid stream 138 includes a mixture of water and target species 104. In an example, fluid stream 138 is a high-temperature vapor stream of water and target species 104. Fluid stream 138 can be provided to compressor 140 to yield aqueous stream 142 and gaseous stream 144. Aqueous stream 142 may consist essentially of water, and can be provided to optional mixer 124 and returned to contactor 106 through aqueous stream 126, to separation system 128, or to other places in system 100. Gaseous stream 144 may consist essentially of the target species, or a gaseous mixture including the target species, which can be collected, compressed (e.g., in a cylinder or tank), and transported (e.g., via a pipeline) to a different location for future use.

System 100 can be operated in a continuous mode, in which aqueous streams 120, 130, 136, and 142 are combined and provided to contactor 106 in aqueous stream 126 at the same time target-species-enriched-gas stream 116 flows from contactor 106 to filter 118. Air or other gaseous components may be vented through outlet 146 of contactor 106 to the atmosphere or collected as gaseous stream 148.

Although described with particular components arranged in a particular order, components in system 100 may be arranged in a configuration different from that illustrated in FIG. 1A. Additionally, one or more of the components may be omitted, or additional components may be added. For example, filter 118 may be combined with separation system 128, such that separation of catalyst 114 and separation of dissolved target species 104' and buffer species 112 are both achieved in separation system 128.

Figure 1B:
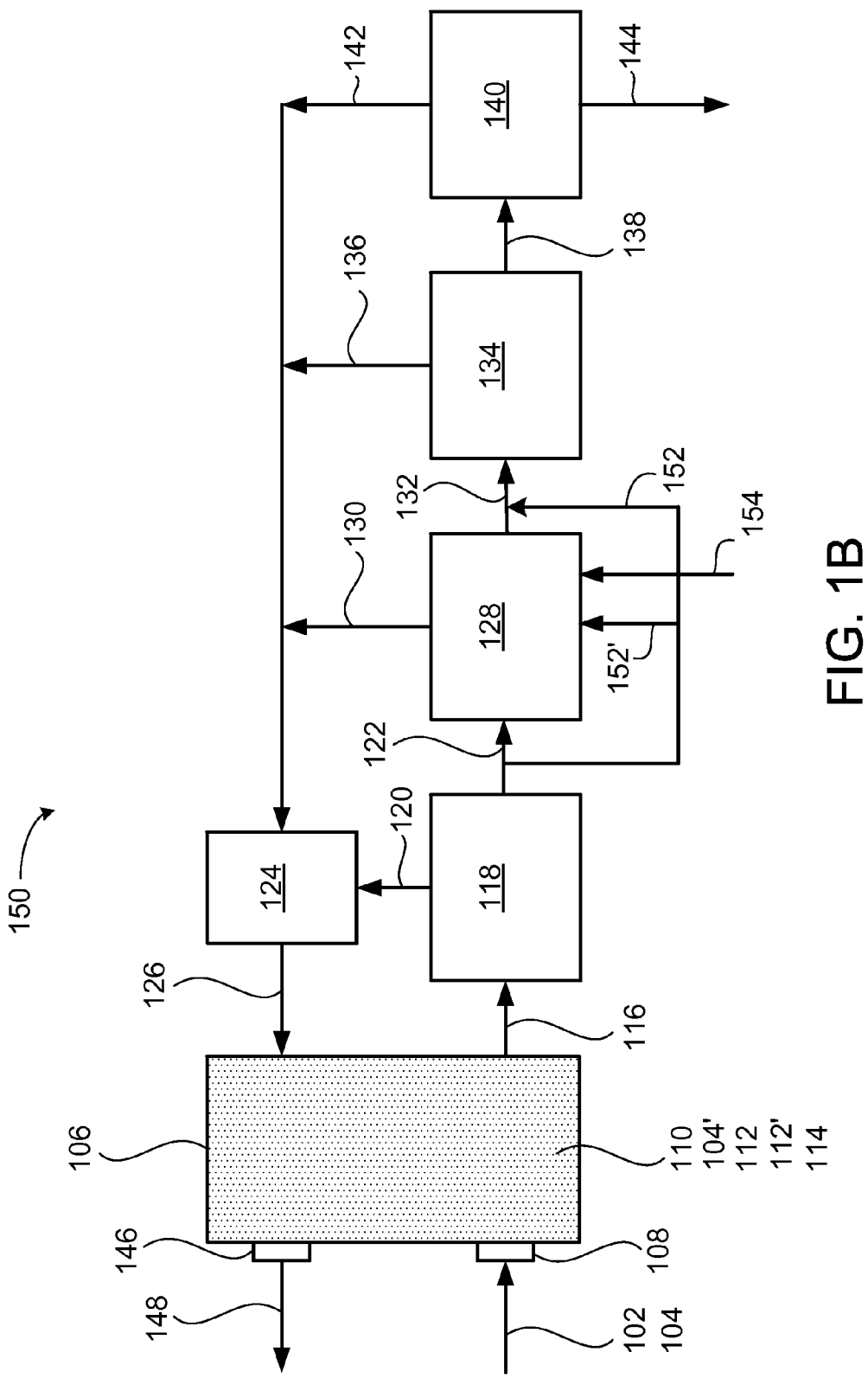

Referring to FIG. 1B, target gas capture is described with respect to illustrative system 150, in which a first portion of aqueous stream 122 enters separation system 128, and a second portion of aqueous stream 122 is diverted as aqueous stream 152 and combined with aqueous stream 132. In some cases, some or all of aqueous stream 152 enters separation system 128 as stream 152' at a location other than that by which aqueous stream 122 enters the separation system (e.g., on an opposite side of a membrane when separation system 128 includes a membrane separation unit). Aqueous stream 132 in FIG. 1B typically has a composition that differs from that of aqueous stream 132 shown in FIG. 1A.

Alternatively, in some cases, stream 122 flows into separation system 128 (without diversion as aqueous stream 152 or 152') and water flows into separation system 128 as aqueous stream 154 at a location other than that by which stream 122 enters the separation system (e.g., on an opposite side of a membrane when separation system 128 includes a membrane separation unit). In this configuration, when separation system 128 includes a membrane separation unit, system 150 sends all of aqueous stream 122 through separation system 128, with water added as stream 154 to the unit to the permeate/product side of the membrane.

In certain cases, system 100 includes a membrane distillation unit, for example, as part of separation system 128, the gas stripper 134, or operatively positioned between the separation system 128 and the gas stripper 134. The membrane distillation unit typically transports vapor via thermal gradients through non-porous hydrophobic membranes, using low grade heat to concentrate a salt solution.

Figure 1C:
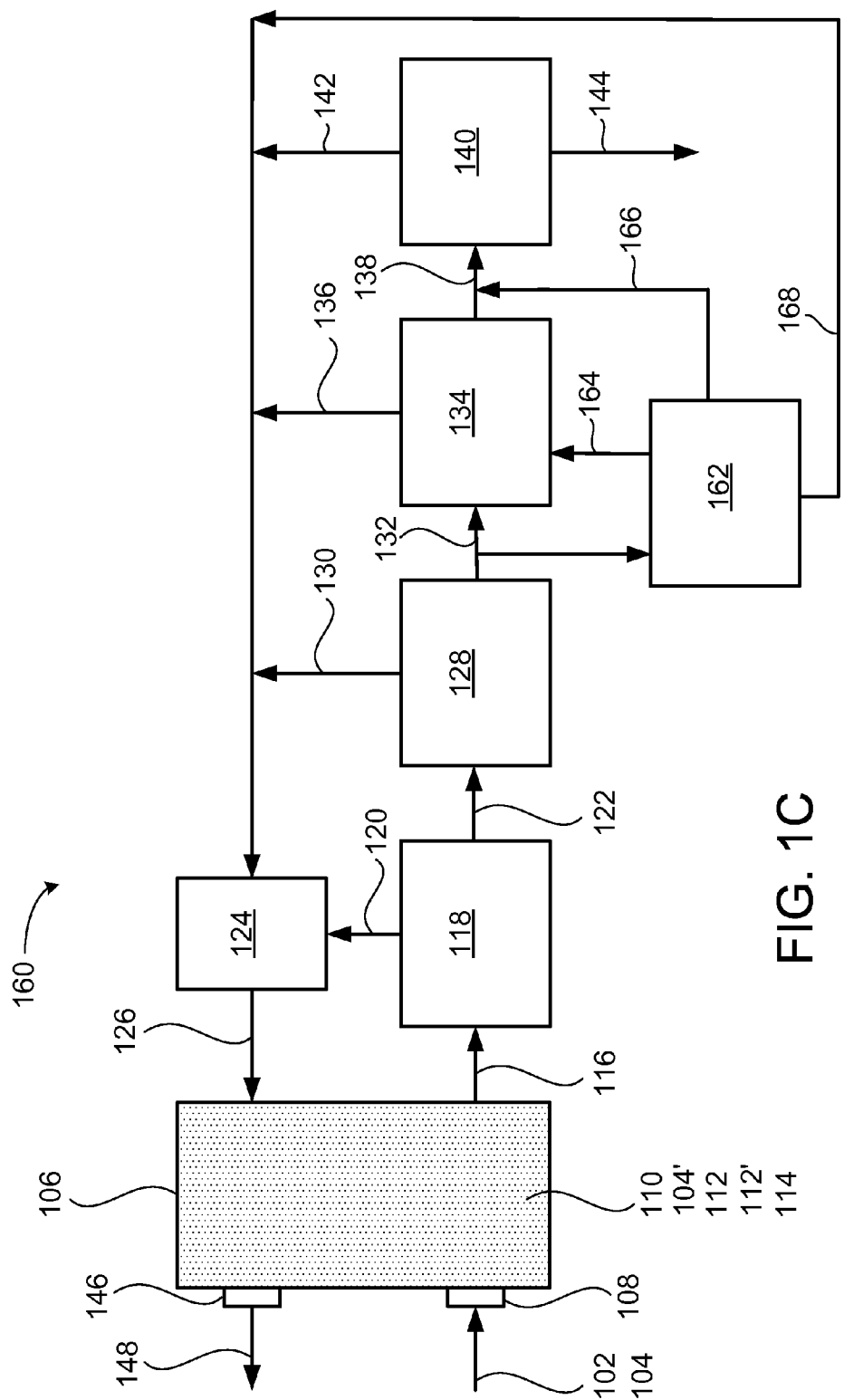

Referring to FIG. 1C, target gas capture is described with respect to illustrative system 160, in which membrane distillation unit 162 i) concentrates dissolved target species 104' in solution and may desorb some of target species 104, thereby allowing a reduction in size of gas stripper 134, or ii) undertakes the full desorption process, thereby obviating the need for or replacing the gas stripper 134. As shown in system 160, membrane distillation unit 162 is operatively positioned between membrane system 128 and gas stripper 134. When the membrane distillation unit 162 partially desorbs target species 104 and/or concentrates dissolved target species 104', part or all of aqueous stream 132 enters the membrane distillation unit, aqueous stream 164 enters gas stripper 134, and fluid stream 166 enters compressor 140. When the membrane distillation unit 162 fully desorbs target species 104 in the absence of stripping unit 134, aqueous stream 132 enters membrane distillation unit 162 and gaseous stream 166 enters compressor unit 140. Aqueous stream 168, depleted at least in part of dissolved target species 104', is returned to contactor 106.

Figure 1D:
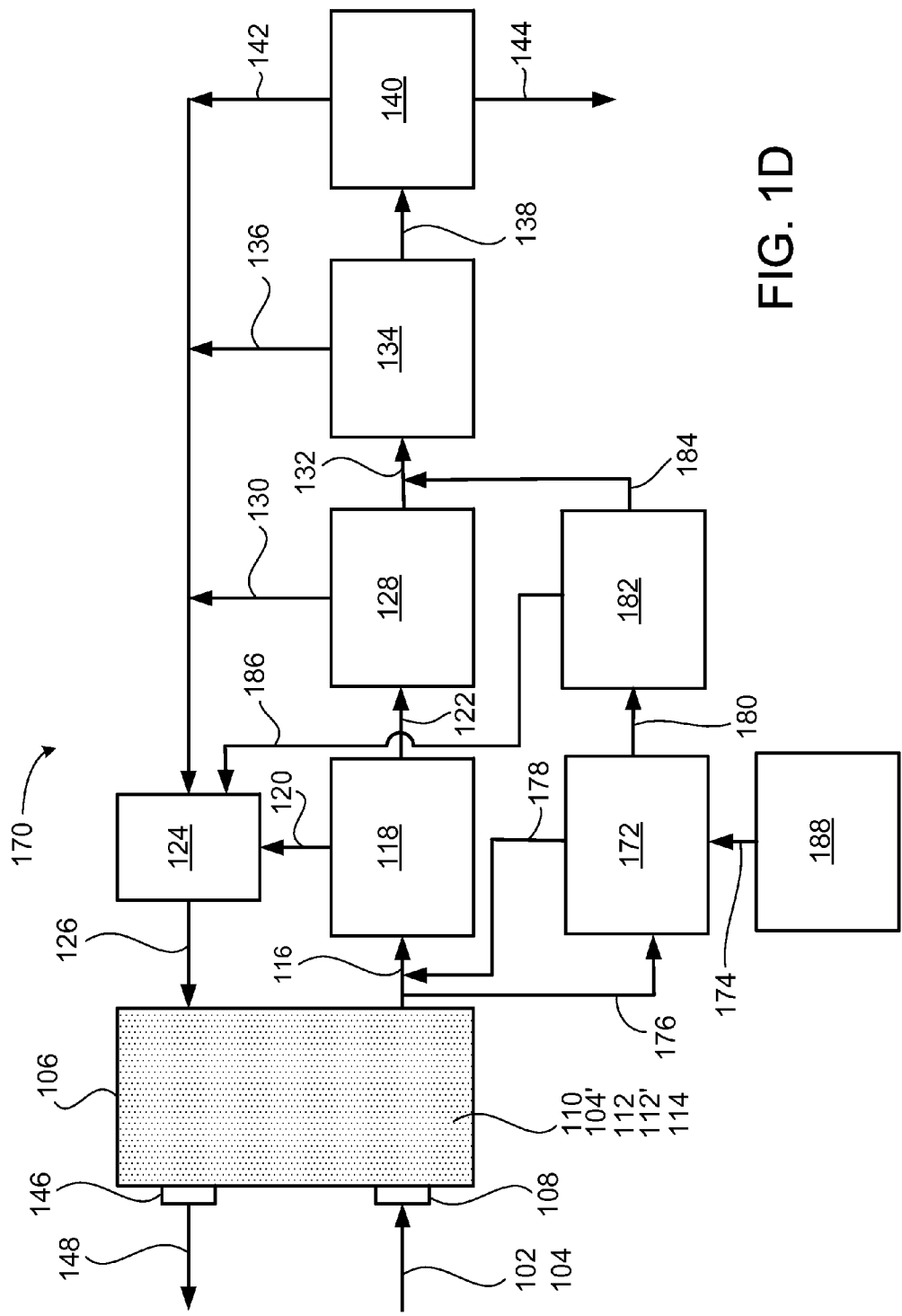

Referring to FIG. 1D, target gas capture is described with respect to illustrative system 170. System 170 may be considered a "full air-capture system," which uses a counterion/buffer species (e.g., potassium carbonate) and a catalyst (e.g., carbonic anhydrase) in aqueous solution 110 and power generation system 188 to generate energy for the entire system. Power generation system 188 may generate power from energy sources including wind energy, solar energy, nuclear energy, geothermal energy, biofuel, and fossil fuel.

Gaseous stream 174 from power generation 188 is flue gas including target species 104 (e.g., $CO_2$). The flue gas may be, for example, flue gas from fossil fuel combustion, flue gas from biofuel combustion, gas from a geological source, industrial gas, or any combination thereof. As shown in FIG. 1D, a portion or all of aqueous stream 116, including target species 104', is sent to flue gas absorber 172 as aqueous stream 176 to capture target species 104 from gaseous stream 174. The concentration of target species 104 is higher in gaseous stream 174 than in gaseous stream 102. After capturing the desired percentage of target species 104 in flue gas stream 174, an aqueous stream from flue gas absorber 172 can be sent to the inlet of filter 118 as aqueous stream 178 or as aqueous stream 180 to filter 182. From filter 182, aqueous stream 184 can be sent to gas stripper 134. Filter 182, when present in system 170, separates catalyst 114 from stream 180, and returns the catalyst to contactor 106 optionally through mixer 124 via aqueous stream 186.

Figure 4:
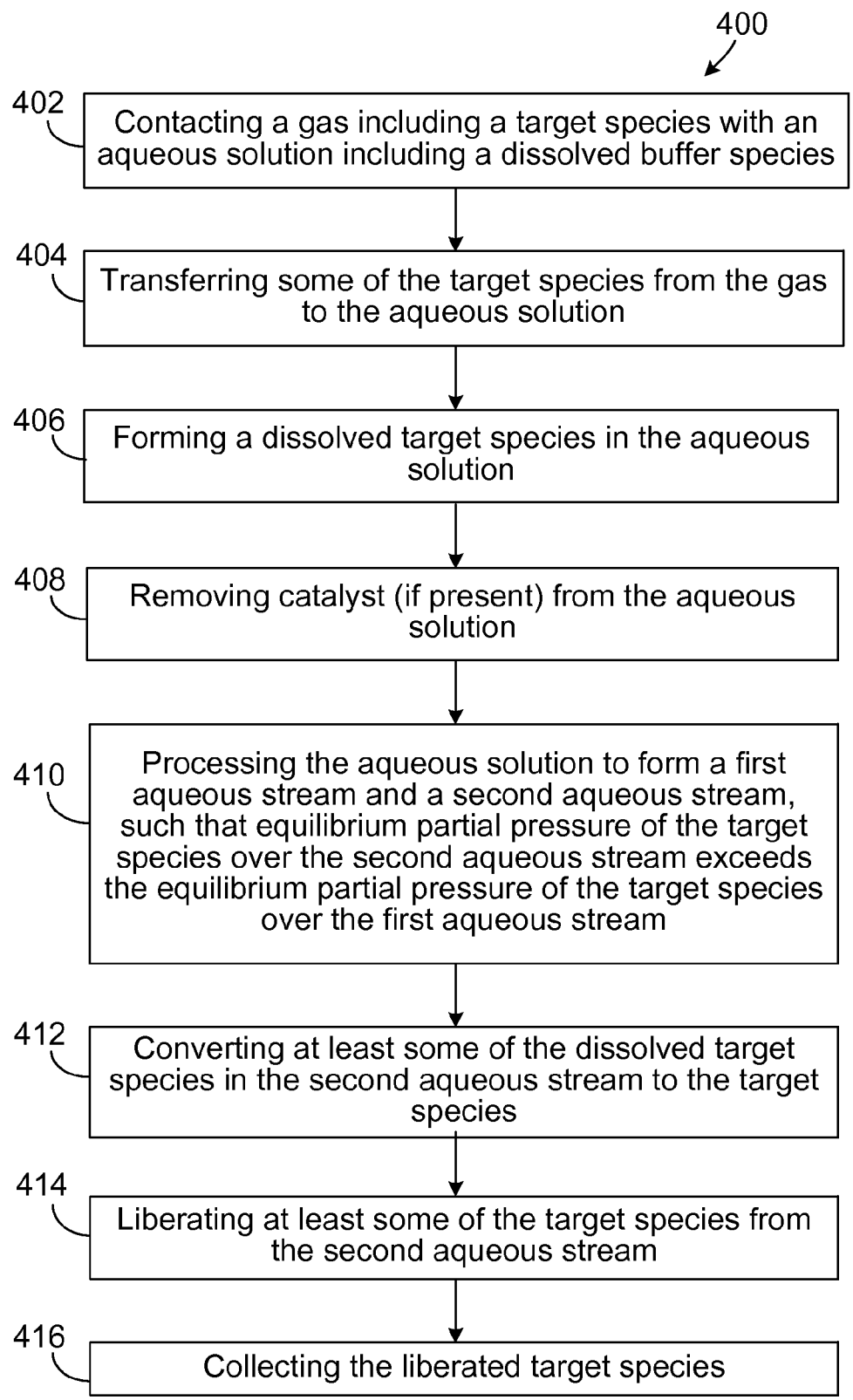
FIG. 4 is a flow diagram of an illustrative method of target gas capture.

FIG. 4 is a flow diagram of illustrative method 400 of target gas capture. Operation 402 includes contacting a gas including a target species with an aqueous solution including a buffer species. In some cases, the aqueous solution includes a catalyst for increasing the rate of absorption of the target species by the aqueous solution. Operation 404 includes transferring some of the target species from the gas to the aqueous solution. Operation 406 includes forming a dissolved target species in the aqueous solution. Forming the dissolved target species may include, for example, forming a solvate or reacting the target species with a component in the aqueous solution to form a different species, such as an ion. In operation 408, the catalyst, if present, can be removed from the aqueous solution.

In operation 410, the aqueous solution is processed to form a first aqueous stream and a second aqueous stream, such that the equilibrium partial pressure of the target species over the second aqueous stream exceeds the equilibrium partial pressure of the target species over the first aqueous stream. Processing may include, for example, separating components in the aqueous solution in a separation process, such as a membrane separation process. In some cases, the fractional concentration of the dissolved target species in the second aqueous stream is higher than the fractional concentration of the dissolved target species in the first aqueous stream. In certain cases, the first aqueous stream has a higher concentration of the buffer species than the second aqueous stream, and the second aqueous stream has a higher concentration of the dissolved target species than the first aqueous stream with respect to the concentration of counterion 112'. In certain cases, operation 412 includes converting at least some of the dissolved target species in the second aqueous stream to the target species, and operation 414 includes liberating at least some of the target species from the second aqueous stream. In operation 416, the target species is collected. In some cases, the collected target species is compressed.

Although described in a particular order, the operations described above may be performed in a different order. Additionally, one or more of the operations may be omitted, or additional operations may be added.

EXAMPLES $CO_2$ Target Species.

When the target species is carbon dioxide, examples of ionic, inorganic buffer species include carbonate ($CO_3^{2-}$) and phosphate ($PO_4^{3-}$), accompanied by an appropriate counterion. Suitable counterions include, for example, lithium, sodium, potassium, rubidium, cesium, beryllium, magnesium, calcium, strontium, barium, ammonium, monoalkylated ammonium cations, dialkylated ammonium cations, trialkylated ammonium cation, tetraalkylated ammonium cations, (mono, di, tri, and) tetraalkanol ammoniums cations, or a combination thereof. Examples of neutral, organic buffer species include alkanolamines, such as monoethanolamine (MEA), diethanolamine (DEA), triethanolamine (TEA), N-methylethanolamine, N-methyldiethano-lamine, dimethylethanolamine, piperazine, 2-amino-2-methyl-1-propanol, 2-(2-aminoethyl-amino)ethanol, 2-amino-2-hydroxymethyl-1,3-propanediol, diisopropanolamine, and the like and amino acids such as arginine, lysine, tyrosine, various organic buffers, or modified versions of amino acids such as nitrogen-methylated versions, carbon-methylated versions, or gamma amino acids.

In some cases, carbonic anhydrase is used as a catalyst in aqueous solution at a concentration in a range from about 0.1 to 100 g/L, to increase the rate of absorption of carbon dioxide by (or transfer of carbon dioxide to) the aqueous solution. As used herein, "carbonic anhydrase" generally refers to any genetic variants, either naturally occurring or evolved through specific man-made directed evolution processes. Other examples of catalysts include zinc-triazacycles and tetraazacycles (as models of carbonic anhydrase active site), copper glycinates, hydroxopentaaminecobalt perchlorate, formaldehyde hydrate, saccharose, fructose, glucose, phenols, phenolates, glycerin, arsenite, hypochlorite, hypobromite, or other oxyanionic species.

In one example in which the buffer species is carbonate and the counterion is sodium, potassium, or a combination thereof, the dissolved target species is bicarbonate, formed as shown below:

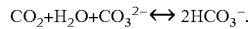

Referring to the membrane separation system described with respect to FIG. 1A, the equilibrium partial pressure of carbon dioxide over aqueous stream 132 exceeds the equilibrium partial pressure of carbon dioxide over aqueous stream 130. In some cases, the fractional concentration of bicarbonate in aqueous stream 132 exceeds the fractional concentration of bicarbonate in aqueous stream 130. In certain cases, the concentration of bicarbonate in aqueous stream 132 exceeds the concentration of bicarbonate in aqueous stream 130, and the concentration of carbonate in aqueous stream 130 exceeds the concentration of carbonate in aqueous stream 132. In an example, the concentration of carbonate in aqueous stream 132 exceeds the concentration of carbonate in aqueous stream 130 while the partial pressure of carbon dioxide above aqueous stream 132 exceeds the partial pressure of carbon dioxide above aqueous stream 130. As used herein, the concentration of the dissolved target species, bicarbonate, is assessed irrespective of the origin of the bicarbonate. That is, some of the bicarbonate may have been introduced to the aqueous stream in the form of the target species, and some of the bicarbonate may have been introduced to the aqueous stream in the form of the buffer species.

The effect of partial separation and/or concentration of the dissolved target species (bicarbonate) with respect to the counterion concentration (i.e., the sum of the concentration of the dissolved target species counterion, and the concentration of the buffer species counterion, if present) has the effect of increasing the partial pressure of the target species in the solution. That is, aqueous stream 130 has a partial pressure of carbon dioxide below the carbon dioxide partial pressure of aqueous stream 122, so aqueous stream 130 could absorb carbon dioxide to reach equilibrium. Aqueous stream 132 has a carbon dioxide partial pressure above the partial pressure of aqueous stream 122, so carbon dioxide could be liberated from aqueous stream 132. Referring to FIG. 3B, the equilibrium partial pressure of carbon dioxide over stream 132" exceeds the equilibrium partial pressure of carbon dioxide over stream 122, and the equilibrium partial pressure of stream 130" is less than the equilibrium partial pressure over stream 122.

Figure 5A:
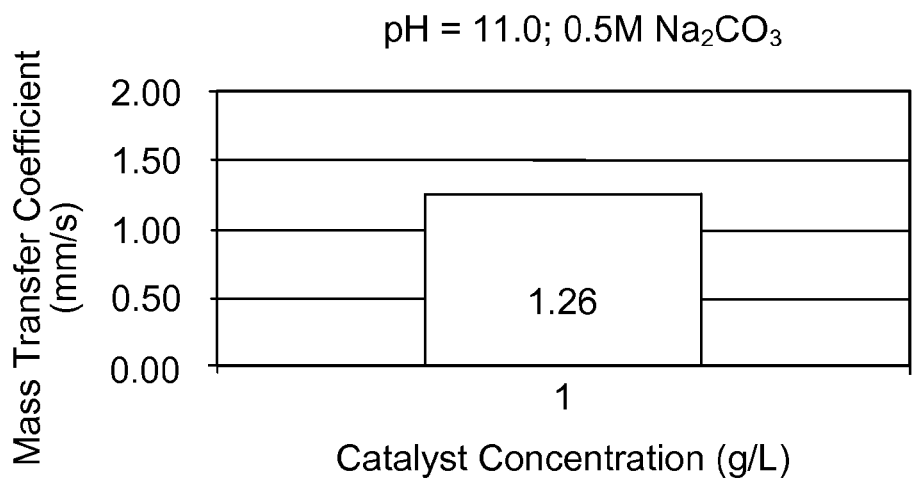
FIGS. 5A-5F show mass transfer coefficients of carbon dioxide into different buffer solutions.
Figure 5B:
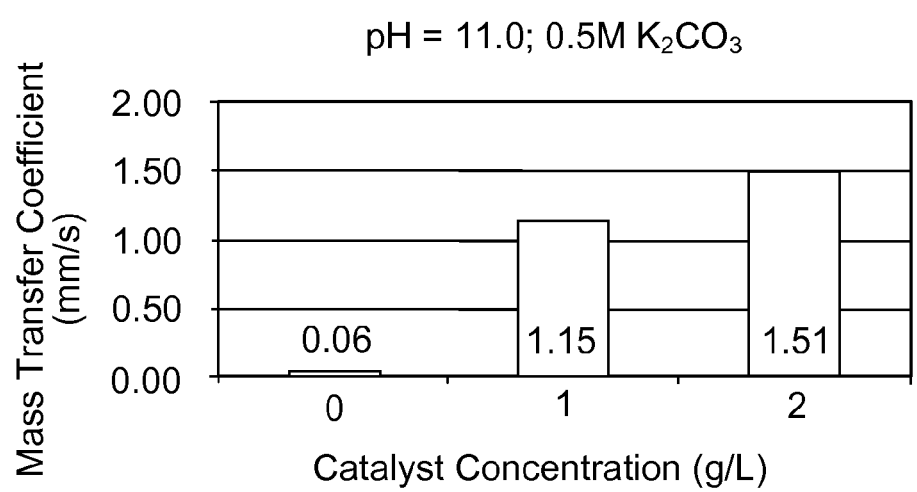
Figure 5C:
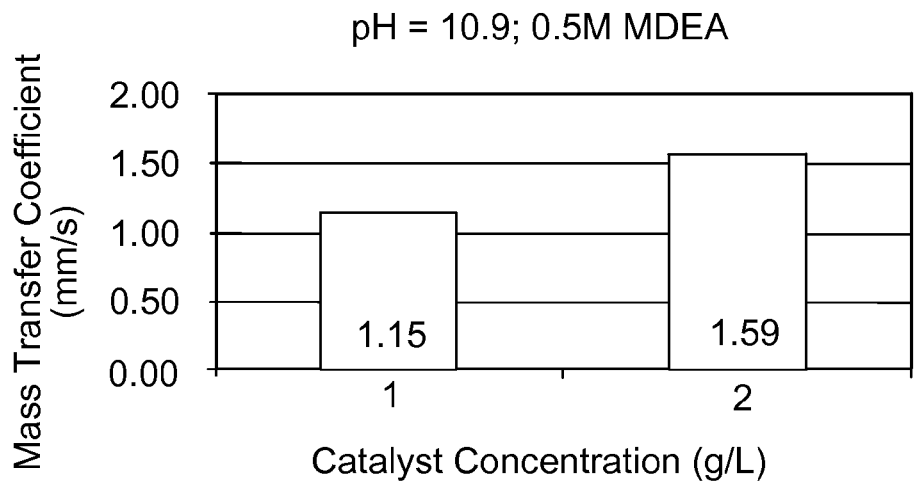
Figure 5D:
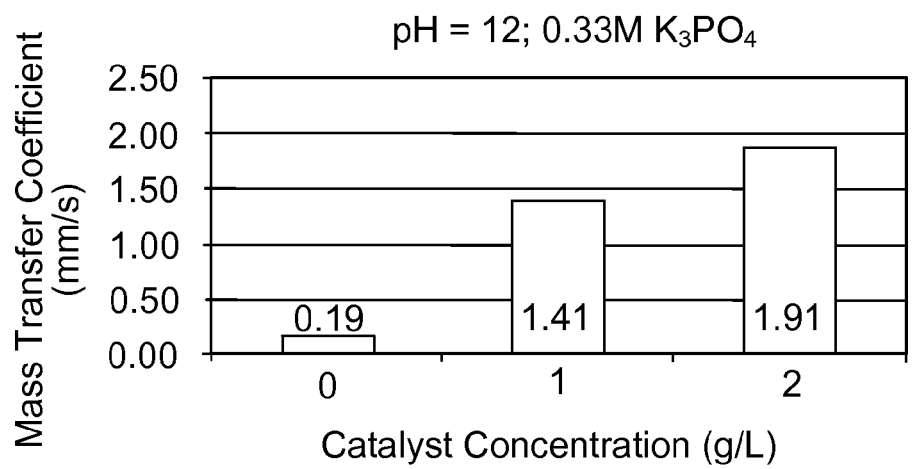
Figure 5E:
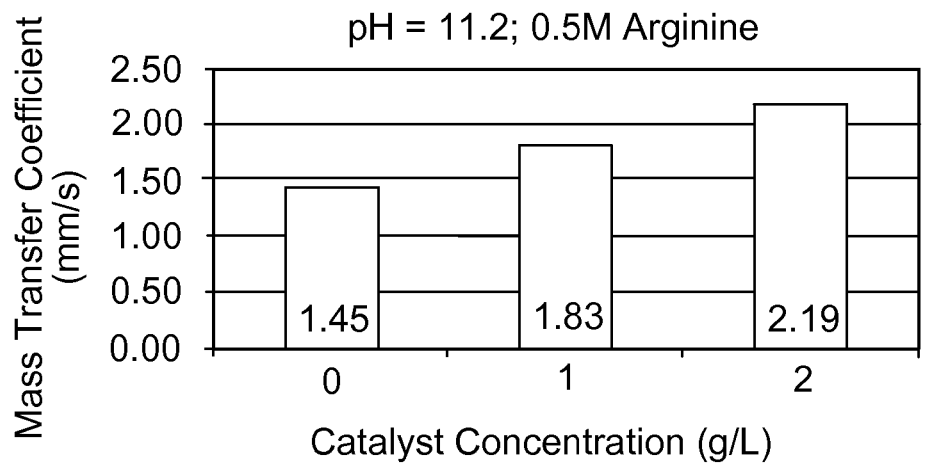
Figure 5F:
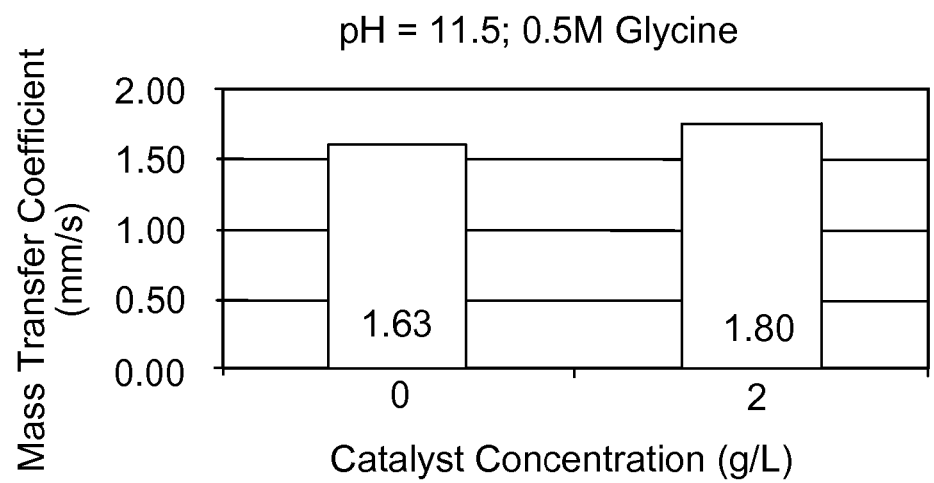

FIGS. 5A-5F show experimentally determined carbon dioxide mass transfer coefficients (with units of mm/s) into different buffer solutions with different concentrations of carbonic anhydrase (available, for example, from Sigma-Aldrich) as a catalyst. FIG. 5A shows a carbon dioxide mass transfer coefficient of 1.26 mm/s into a 0.5M buffer solution of sodium carbonate with a pH of 11.0 and a carbonic anhydrase concentration of 1 g/L. FIG. 5B shows carbon dioxide mass transfer coefficients of 0.06 mm/s, 1.15 mm/s, and 1.51 mm/s into 0.5M buffer solutions of potassium carbonate with a pH of 11.0 and carbonic anhydrase concentrations of 0 g/L, 1 g/L, and 2 g/L, respectively. FIG. 5C shows carbon dioxide mass transfer coefficients of 1.15 mm/s and 1.59 mm/s into a 0.5M buffer solution of N-methyldiethanolamine (MDEA) with a pH of 10.9 and carbonic anhydrase concentrations of 1 g/L and 2 g/L, respectively. FIG. 5D shows carbon dioxide mass transfer coefficients of 0.19 mm/s, 1.41 mm/s, and 1.91 mm/s into 0.33M buffer solutions of potassium phosphate with a pH of 12.0 and carbonic anhydrase concentrations of 0 g/L, 1 g/L, and 2 g/L, respectively. FIG. 5E shows carbon dioxide mass transfer coefficients of 1.45 mm/s, 1.83 mm/s, and 2.19 mm/s into 0.5M buffer solutions of arginine with a pH of 11.2 and carbonic anhydrase concentrations of 0 g/L, 1 g/L, and 2 g/L, respectively. FIG. 5F shows carbon dioxide mass transfer coefficients of 1.63 mm/s and 1.80 mm/s into 0.5M buffer solutions of glycine with a pH of 11.5 and carbonic anhydrase concentrations of 0 g/L and 2 g/L, respectively. As seen in FIGS. 5A-5F, the carbonic anhydrase improves carbon dioxide uptake in aqueous solutions with buffer species including inorganic salts, amines, and amino acids and having a pH in a range from about 11 to about 12.

Figure 6:
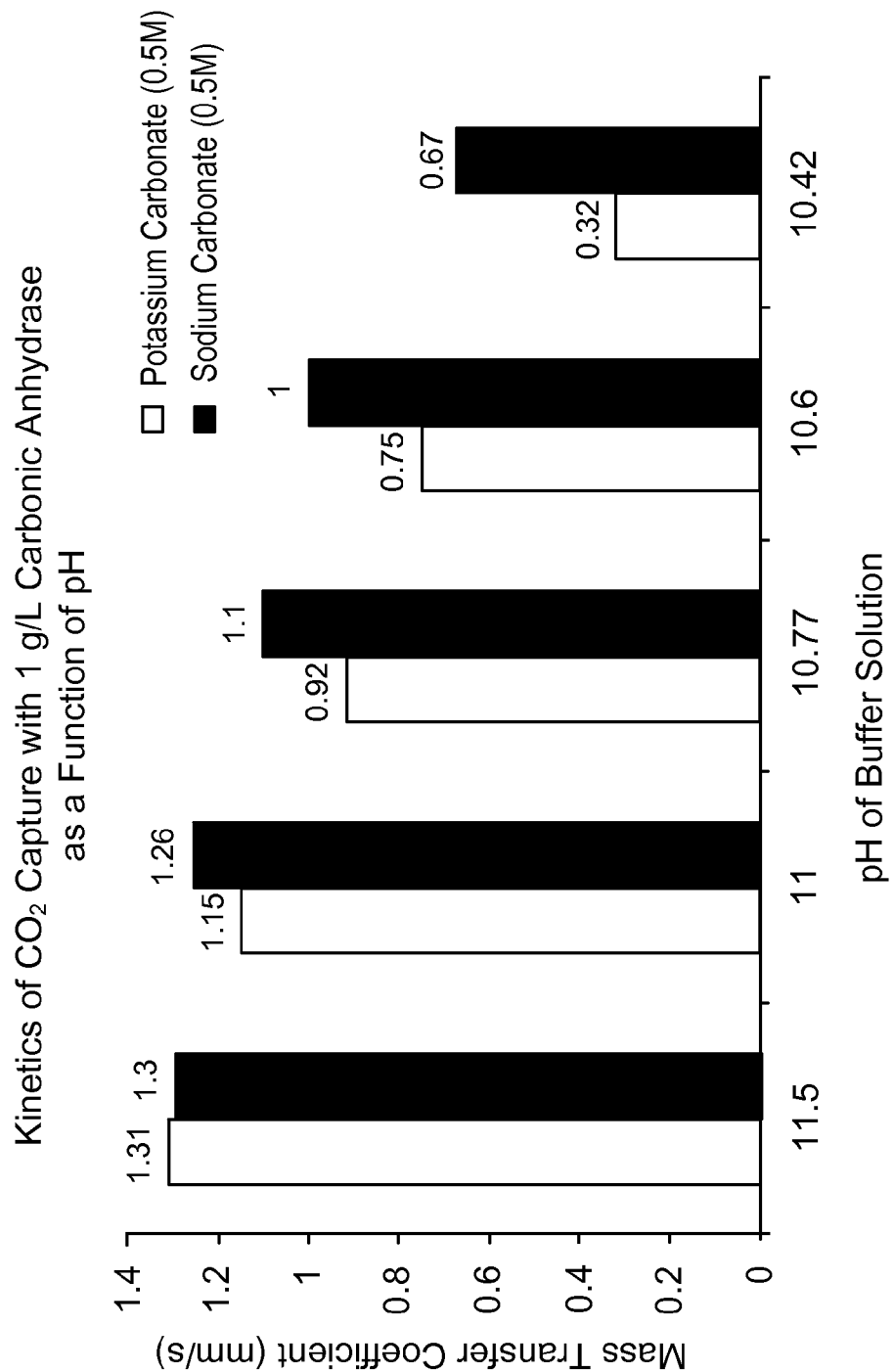
FIG. 6 show mass transfer coefficients of carbon dioxide into various solutions containing potassium carbonate and sodium carbonate buffers, as a function of pH.

FIG. 6 shows the change in carbon dioxide mass transfer coefficient into 0.5M buffer solutions of potassium carbonate with 1 g/L carbonic anhydrase (left bar of each pair) and 0.5M buffer solutions of sodium carbonate with 1 g/L carbonic anhydrase (right bar of each pair) over a pH range of about 10.5 to about 11.5. With increasing pH, the mass transfer coefficient into the potassium carbonate solution increases from 0.32 mm/s to 1.31 mm/s, and the mass transfer coefficient into the sodium carbonate solution increases from 0.67 mm/s to 1.3 mm/s. In these descriptions, the mass transfer coefficients are defined as follows: the flux of carbon dioxide into the absorbing liquid with units of mol/(m²·s) is equal to the mass transfer coefficient (with units of m/s or mm/s)

multiplied by the concentration of $CO_2$ in the gas phase (with units of moles of $CO_2$ per $m^3$ of gas).

Electrodialysis experiments were performed in an Ameridia EUR2B electrodialysis cell equipped with five pairs of cation exchange membranes and anion exchange membranes. Electrodes were located at either end of the membrane stack, and alternating cation exchange membranes and anion exchange membranes formed the membrane stack itself. Cation exchange membranes were Neosepta CMX and anion exchange membranes were chosen to optimize performance. Each pair of membranes had a surface area of 200 $cm^2$, and there were five pairs for a total working surface area of 1000 $cm^2$. The electrodialysis stack was maintained at a constant temperature using cooling water.

Example 1

Electrodialysis

The membrane stack was prepared with five pairs of Neosepta CMX (manufactured by Astom) cation exchange membranes and Neosepta ACS (manufactured by Astom) anion exchange membranes, with electrodes placed at each end of the stack and a total working area of 1000 $cm^2$. A 20 L solution of about 2 mol/L potassium ion was prepared as the feed solution with a mixture of carbonate and bicarbonate. The concentrations were about 0.86 mol/L potassium carbonate and about 0.25 mol/L potassium bicarbonate. The receiving solution was about 2 L of solution with about 0.22 mol/L potassium carbonate and about 0.62 mol/L potassium bicarbonate. The membrane stack was maintained at about 40° C. and the voltage was held at 0.8 V/cell and the unit was run for a period of about two hours. A final solution of about 1.66M potassium bicarbonate and 2.26M potassium ion was achieved. The partial pressure of carbon dioxide was determined based on these parameters and using the above equation for calculating the partial pressure of carbon dioxide. These results are included in Table 1.

Example 2

Electrodialysis

The membrane stack was prepared with five pairs of Neosepta CMX (manufactured by Astom) cation exchange membranes and Selemion ASV (manufactured by Asahi Glass Company Limited) anion exchange membranes, with electrodes placed at each end of the stack and a total working area of 1000 $cm^2$. A 20 L solution of about 2 mol/L potassium ion was prepared as the feed solution with a mixture of carbonate and bicarbonate. The concentrations were about 0.86 mol/L potassium carbonate and about 0.25 mol/L potassium bicarbonate. The receiving solution was about 2 L of solution of about 0.22 mol/L potassium carbonate and about 0.62 mol/L potassium bicarbonate. The membrane stack was maintained at about 40° C. and the voltage was held at 0.8 V/cell and the unit was run for an extended period of time. A final solution of about 1.4M potassium bicarbonate and 2.24M potassium ion was achieved. The partial pressure of carbon dioxide was determined with these parameters and using the above equation for calculating the partial pressure of carbon dioxide. These results are included in Table 1.

Example 3

Electrodialysis

The membrane stack was created with five pairs of Neosepta CMX (manufactured by Astom) cation exchange membranes Neosepta AFX (manufactured by Astom) anion exchange membranes, with electrodes placed at each end of the stack and a total working area of 1000 $cm^2$. A 20 L solution of about 2 mol/L potassium ion was prepared as the feed solution with a mixture of carbonate and bicarbonate. The concentrations were about 0.86 mol/L potassium carbonate and about 0.25 mol/L potassium bicarbonate. The receiving solution was about 2 L of solution including about 0.22 mol/L potassium carbonate and about 0.62 mol/L potassium bicarbonate. The membrane stack was maintained at about 38° C. and the voltage was held at 0.6 V/cell and the unit was run for an extended period of time. A final solution of about 0.5M potassium bicarbonate and 3.6M potassium ion was achieved. The partial pressure of carbon dioxide was determined with these parameters and using the above equation for calculating the partial pressure of carbon dioxide. These results are included in Table 1.

Example 4

Nanofiltration

Nanofiltration experiments were conducted on SEPA CF NF/RO equipment using a flat sheet membrane layout. Total membrane area was 140 $cm^2$. The membrane was a KMS SR100 membrane which was cut to fit properly in the membrane housing systems. A solution of about 5 L (about 0.9 mol/L potassium carbonate and about 0.2 mol/L potassium bicarbonate) was fed to the nanofiltration apparatus at an applied pressure of about 5500 kPa. The filtrate solution was collected and the concentration of potassium carbonate and potassium bicarbonate were determined. The partial pressure of carbon dioxide was then calculated based on these parameters and using the above equation for calculating the partial pressure of carbon dioxide. These results are included in Table 1.

Example 5

Nanofiltration

Nanofiltration experiments were conducted on SEPA CF NF/RO equipment using a flat sheet membrane layout. Total membrane area was 140 $cm^2$. The membrane was a KMS SR100 membrane which was cut to fit properly in the membrane housing systems. A solution of about 5 L (about 0.9 mol/L potassium carbonate and about 0.2 mol/L potassium bicarbonate) was fed to the nanofiltration apparatus at an applied pressure of about 6200 kPa. The filtrate solution was collected and the concentration of potassium carbonate and potassium bicarbonate were determined. The partial pressure of carbon dioxide was then calculated based on these parameters and using the above equation for calculating the partial pressure of carbon dioxide. These results are included in Table 1.

Example 6

Nanofiltration

Nanofiltration experiments were conducted on SEPA CF NF/RO equipment using a flat sheet membrane layout. Total membrane area was 140 $cm^2$. The membrane was a KMS SR100 membrane which was cut to fit properly in the membrane housing systems. A solution of about 5 L (about 0.9 mol/L potassium carbonate and about 0.2 mol/L potassium bicarbonate) was fed to the nanofiltration apparatus at an applied pressure of 6900 kPa. The filtrate solution was collected and the concentration of potassium carbonate and potassium bicarbonate were determined. The partial pressure of carbon dioxide was then calculated based on these parameters and using the above equation for calculating the partial pressure of carbon dioxide. These results are included in Table 1.

TABLE 1

Parameters showing the concentrations of bicarbonate and the partial pressures of carbon dioxide for initial and final solutions.

| | Initial [KHCO$_3$] (mol/L) | Initial [K+] (mol/L) | Initial Partial Pressure of CO$_2$ (kPa) | Final [KHCO$_3$] (mol/L) | Final [K+] (mol/L) | Final Partial Pressure of CO$_2$ |
|---|---|---|---|---|---|---|
| Example 1 | 0.25 | 1.97 | 0.070 | 1.66 | 2.26 | 9.31 |
| Example 2 | 0.25 | 1.97 | 0.070 | 1.4 | 2.24 | 4.73 |
| Example 3 | 0.25 | 1.97 | 0.070 | 0.5 | 3.6 | 0.19 |
| Example 4 | 0.2 | 2.0 | 0.043 | 0.21 | 0.6 | 0.142 |
| Example 5 | 0.2 | 2.0 | 0.043 | 0.17 | 0.36 | 0.158 |
| Example 6 | 0.2 | 2.0 | 0.043 | 0.15 | 0.25 | 0.202 |

Figure 7A:
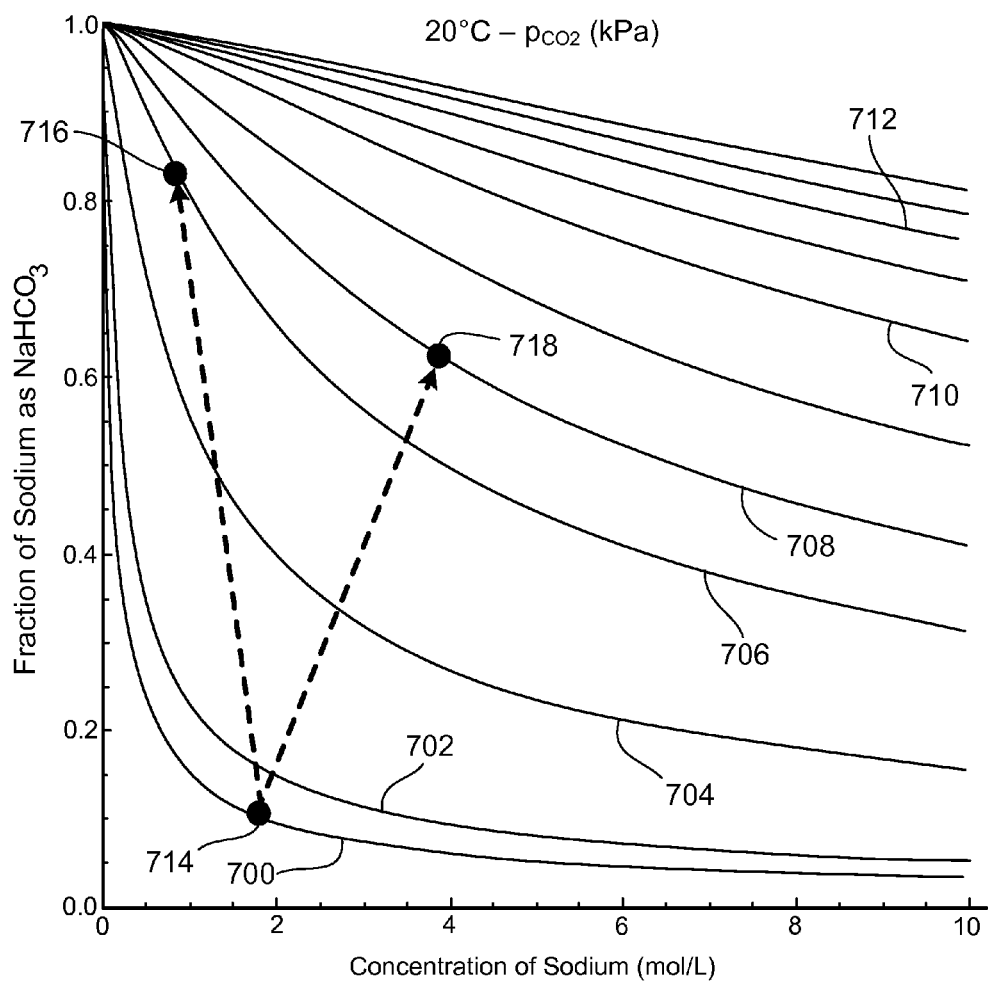
FIGS. 7A and 7B are contour plots showing calculated carbon dioxide partial pressure in a buffer solution including sodium carbonate as a function of the fraction of bicarbonate and the sodium concentration.

FIG. 7A is a contour plot showing the calculated partial pressure of carbon dioxide (in kPa) in sodium carbonate buffer solutions as a function of the fraction of bicarbonate with respect to the sum of the concentration of dissolved target species counterion (sodium) and the buffer species counterion (sodium), or ([HCO$_3$⁻]/[counterion]) (mol/L) at 20° C. for the process shown in FIG. 4. Contour lines 700, 702, 704, 706, 708, 710, and 712 represent systems with a carbon dioxide partial pressure of 0.04 kPa, 0.1 kPa, 1 kPa, 5 kPa, 10 kPa, 40 kPa, and 80 kPa, respectively, at 20° C. In an example, absorption of carbon dioxide may occur at point 714 when the carbon dioxide partial pressure is 0.04 kPa. The membrane separation process separates bicarbonate from carbonate, yielding a solution, shown by 716, having a higher fraction of bicarbonate than the solution shown by 714, and having a carbon dioxide partial pressure of 5 kPa. The systems represented by 714 and 716 are both at 20° C.

Figure 7B:
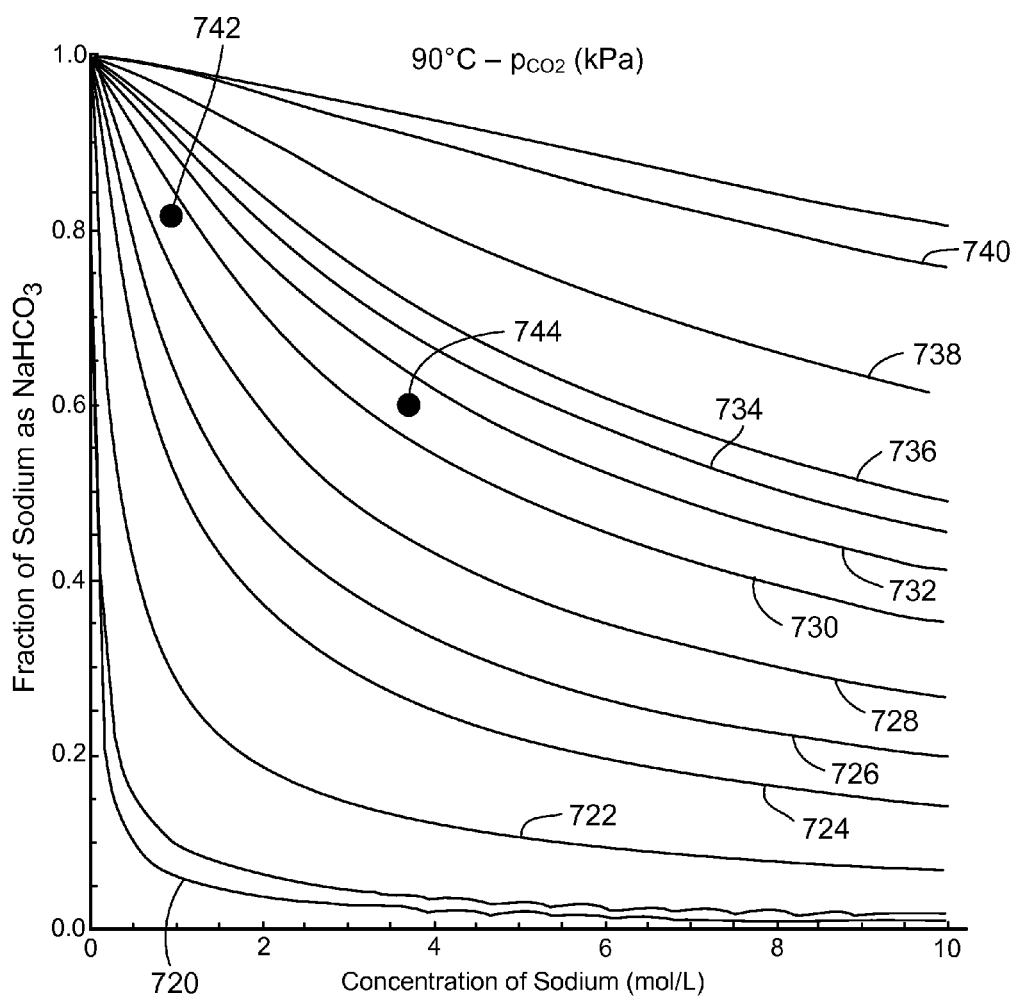

The system represented by 716 can be heated to liberate carbon dioxide. FIG. 7B is a contour plot showing the calculated partial pressure of carbon dioxide in sodium carbonate buffer solutions as a function of the fraction of bicarbonate and the concentration of sodium at 90° C. for the process shown in FIG. 4. In FIG. 7B, contour lines 720, 722, 724, 726, 728, 730, 732, 734, 736, 738, and 740 represent systems with a carbon dioxide partial pressure of 0.04 kPa, 1 kPa, 5 kPa, 10 kPa, 20 kPa, 40 kPa, 60 kPa, 80 kPa, 100 kPa, 200 kPa, and 500 kPa, respectively, at 90° C.

The system that results from heating the solution shown by 716 in FIG. 7A to 90° C. is represented by point 742 in FIG. 7B. The system represented by 742 has a carbon dioxide partial pressure of about 30 kPa and substantially the same fraction of bicarbonate and sodium concentration as the system represented by 716. Thus, the carbon dioxide partial pressure at 742 is greater than the carbon dioxide partial pressure at 716.

In some cases, the concentration of sodium as well as the fraction of bicarbonate is increased in the membrane separation process. For example, absorption of carbon dioxide may occur at point 714, and the membrane separation process may yield the system represented by point 718 in FIG. 7A rather than the system represented by point 716. In this case, the system that results from heating the system represented by 718 in FIG. 7A to 90° C. is represented by point 744 in FIG. 7B. The system represented by 744 has a carbon dioxide partial pressure of about 55 kPa and substantially the same fraction of bicarbonate and sodium concentration as the system represented by 718. Thus, the carbon dioxide partial pressure at 744 is greater than the carbon dioxide partial pressure at 718.

Advantages of the systems and method described herein can be understood by way of explanation with respect to carbon dioxide in atmospheric air. In the absence of membrane separation unit 128, a potassium carbonate solution (with potassium concentration of about 2 mol/L) that is in equilibrium with atmospheric air will have a partial pressure of carbon dioxide of about 0.04 kPa at about 20° C. If this solution were heated directly in a gas stripper similar to unit 134 in FIG. 1A, the resulting partial pressure of carbon dioxide in the gas stripper at 100° C. would be about 0.29 kPa. The addition of membrane separation unit 128, as exemplified by electrodialysis performance in Example 1, would achieve a partial pressure of carbon dioxide of 68.7 kPa in gas stripper 134 at 100° C. This represents an increase in the partial pressure of carbon dioxide of over 1700 times with respect to aqueous stream 110, and a similar enrichment of target species 104 in fluid stream 138 with respect to gaseous stream 102.

A number of embodiments have been described. Nevertheless, it will be understood that various modifications may be made without departing from the spirit and scope of the disclosure. Accordingly, other embodiments are within the scope of the following claims. Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description. Changes may be made in the elements described herein without departing from the spirit and scope as described in the following claims.

What is claimed is:

1. A method comprising:
   contacting a gas comprising a target species with an aqueous solution comprising a buffer species, wherein a concentration of the target species in the gas is less than about 1 vol %;
   transferring some of the target species from the gas to the aqueous solution comprising the buffer species;
   forming a dissolved target species in the aqueous solution comprising the buffer species, thereby yielding an aqueous solution comprising the dissolved target species;
   processing the aqueous solution comprising the dissolved target species to yield a first aqueous stream and a second aqueous stream, wherein the equilibrium partial pressure of the target species over the second aqueous stream exceeds the equilibrium partial pressure of the target species over the first aqueous stream; and
   converting at least some of the dissolved target species in the second aqueous stream to the target species.

2. The method of claim 1, wherein the ratio of the concentration of the dissolved target species in the second aqueous stream to the sum of the concentration of the dissolved target species and twice the concentration of the buffer species in the second aqueous stream exceeds the ratio of the concentration of the dissolved target species in the first aqueous stream to the sum of the concentration of the dissolved target species and twice the concentration of the buffer species in the first aqueous stream.

3. The method of claim 1, wherein the aqueous solution comprising the dissolved target species further comprises a dissolved target species counterion, a buffer species counterion, or a combination thereof, and the ratio of the concentration of the dissolved target species in the second aqueous stream to the sum of the concentration of the dissolved target species counterion and the concentration of the buffer species counterion in the second aqueous stream exceeds the ratio of the concentration of the dissolved target species in the first aqueous stream to the sum of the concentration of the dissolved target species counterion and the concentration of the buffer species counterion in the first aqueous stream.

4. The method of claim 1, wherein the aqueous solution comprising the dissolved target species further comprises a dissolved target species counterion, a buffer species counterion, or a combination thereof, and the first aqueous stream has a higher concentration of the buffer species than the second aqueous stream, the second aqueous stream has a higher concentration of the dissolved target species than the first aqueous stream, and the second aqueous stream has a higher ratio of the concentration of the dissolved target species to the sum of the concentration of the dissolved target species counterion and the concentration of the buffer species counterion than the first aqueous stream.

5. The method of claim 1, wherein the aqueous solution comprising the dissolved target species further comprises a dissolved target species counterion, a buffer species counterion, or a combination thereof, and the first aqueous stream has a higher concentration of the buffer species than the second aqueous stream, the second aqueous stream has a lower concentration of the dissolved target species than the first aqueous stream, and the second aqueous stream has a higher ratio of the concentration of the dissolved target species to the sum of the concentration of the dissolved target species counterion and the concentration of the buffer species counterion than the first aqueous stream.

6. The method of claim 1, wherein the buffer species is a neutral species or a monovalent, divalent, or trivalent anion, and the dissolved target species is a monovalent anion.

7. The method of claim 1, wherein the aqueous solution comprising the buffer species further comprises a catalyst for increasing the rate of transfer of the target species from the gas to the aqueous solution comprising the buffer species.

8. The method of claim 7 wherein the catalyst is chosen from the group consisting of carbonic anhydrase, zinc triazacycles, zinc tetraazacycles, copper glycinates, hydroxopentaaminecobalt perchlorate, formaldehyde hydrate, saccharose, fructose, glucose, phenols, phenolates, glycerin, arsenite, hypochlorite, hypobromite, or other oxyanionic species.

9. The method of claim 7, wherein the aqueous solution comprising the dissolved target species comprises the catalyst, and further comprising removing the catalyst from the aqueous solution comprising the dissolved target species before processing the aqueous solution comprising the dissolved target species.

10. The method of claim 9, wherein removing the catalyst from the aqueous solution comprising the dissolved target species comprises filtering the aqueous solution comprising the dissolved target species.

11. The method of claim 1, wherein processing the aqueous solution comprising the dissolved target species comprises contacting the aqueous solution comprising the dissolved target species with a membrane to separate a portion of the buffer species from the dissolved target species or to separate a portion of the dissolved target species from the buffer species.

12. The method of claim 11, wherein the membrane is an ion-exchange membrane.

13. The method of claim 12, wherein the ion-exchange membrane is a monovalent anion-exchange membrane that preferentially facilitates the passage of monovalent anions over multivalent anions.

14. The method of claim 12, wherein processing the aqueous solution comprising the dissolved target species comprises contacting the aqueous solution comprising the dissolved target species with a membrane to filter the aqueous solution comprising the dissolved target species based at least in part on hydrodynamic radius or molecular weight of the buffer species and the target species.

15. The method of claim 1, wherein processing the aqueous solution comprising the dissolved target species comprises subjecting the aqueous solution comprising the dissolved target species to a process or combination of processes selected from the group consisting of electrodialysis, reverse osmosis, ultrafiltration, microfiltration, nanofiltration, diffusion dialysis, dialysis, Donnan dialysis, piezodialysis, pervaporation, membrane distillation, and ion chromatography.

16. The method of claim 1, further comprising, after converting at least some of the dissolved target species in the second aqueous stream to the target species:
  liberating at least some of the target species from the second aqueous stream; and
  collecting the liberated target species.

17. The method of claim 14, further comprising combining the second aqueous stream with the first aqueous stream after liberating at least some of the target species from the second aqueous stream.

18. The method of claim 1, wherein converting at least some of the target species in the second aqueous stream to the target species comprises heating the second aqueous stream, reducing a pressure above the second aqueous stream, or a combination thereof.

19. The method of claim 1, wherein converting at least some of the target species from the second aqueous stream to the target species comprises providing the second aqueous stream to a gas stripper, to a membrane distillation unit, or to a gas stripper and a membrane distillation unit in any order.

20. The method of claim 1, wherein the gas is atmospheric air.

21. The method of claim 1, wherein the pH of the aqueous solution comprising the dissolved target species before processing is between 8 and 13.

22. The method of claim 1, wherein the target species is an acid gas.

23. The method of claim 22, wherein the target species is selected from the group consisting of $H_2S$, $CO_2$, $SO_2$, $NO$, $NO_2$, and $N_2O$.

24. The method of claim 23, wherein the target species is $CO_2$ and the dissolved target species is bicarbonate or a carbamate.

25. The method of claim 1, wherein the buffer species is organic or inorganic and is selected from the group consisting of carbonate ions, phosphate ions, amines, alkanolamines, and amino acids.

* * * * *